(12) United States Patent
Cronwright

(10) Patent No.: US 10,322,773 B2
(45) Date of Patent: Jun. 18, 2019

(54) ADJUSTABLE BALLAST BULB FOR A SAILING VESSEL

(71) Applicant: Sarah-May Steenkamp, Cape Town (ZA)

(72) Inventor: Keith Louis Featherstone Cronwright, Cape Town (ZA)

(73) Assignee: SARAH-MAY STEENKAMP, Cape Town (ZA)

( * ) Notice: Subject to any disclaimer, the term of this patent is extended or adjusted under 35 U.S.C. 154(b) by 0 days.

(21) Appl. No.: 15/738,750

(22) PCT Filed: May 16, 2016

(86) PCT No.: PCT/IB2016/052815
§ 371 (c)(1),
(2) Date: Dec. 21, 2017

(87) PCT Pub. No.: WO2016/185357
PCT Pub. Date: Nov. 24, 2016

(65) Prior Publication Data
US 2019/0016415 A1    Jan. 17, 2019

(30) Foreign Application Priority Data

May 19, 2015    (ZA) .................................. 2015/03491

(51) Int. Cl.
*B63B 3/38*    (2006.01)
*B63B 9/08*    (2006.01)
(Continued)

(52) U.S. Cl.
CPC .................. *B63B 3/38* (2013.01); *B63B 9/08* (2013.01); *B63B 15/0083* (2013.01);
(Continued)

(58) Field of Classification Search
CPC .. B63B 3/00; B63B 3/38; B63B 43/00; B63B 43/08; B63B 43/18; B63B 35/00;
(Continued)

(56) References Cited

U.S. PATENT DOCUMENTS

| 4,686,922 A | * | 8/1987 | Burroughs | .............. B63B 41/00 114/124 |
| 7,938,076 B2 | * | 5/2011 | Ulgen | ..................... B63B 41/00 114/124 |

(Continued)

FOREIGN PATENT DOCUMENTS

| DE | 8900770 | 9/1989 |
| DE | 4229101 | 3/1994 |
| EP | 0373913 | 6/1990 |

OTHER PUBLICATIONS

International Search Report dated Nov. 13, 2017 in corresponding International Patent Application No. PCT/IB2016/052815.

*Primary Examiner* — Lars A Olson
(74) *Attorney, Agent, or Firm* — Stephen J. Weyer, Esq.; Stites & Harbison, PLLC

(57) ABSTRACT

A sailing vessel is disclosed which comprises a hull, a keel depending from the hull and a mast. A ballast bulb is provided at the lower end of the keel. A first control mechanisms is provided for rotating the ballast bulb about a transverse axis to change the angle of attack of the bulb. A second control mechanism is provided for rotating the bulb about a longitudinal axis of the vessel.

9 Claims, 43 Drawing Sheets

(51) Int. Cl.
*B63B 41/00* (2006.01)
*B63B 39/02* (2006.01)
*B63B 15/00* (2006.01)
*B63B 15/02* (2006.01)
B63B 35/00 (2006.01)
F16H 55/22 (2006.01)

(52) U.S. Cl.
CPC .............. *B63B 15/02* (2013.01); *B63B 39/02* (2013.01); *B63B 41/00* (2013.01); B63B 2003/385 (2013.01); B63B 2015/005 (2013.01); B63B 2015/0016 (2013.01); B63B 2035/009 (2013.01); F16H 55/22 (2013.01)

(58) Field of Classification Search
CPC ........... B63B 9/08; B63B 41/00; B63B 39/02; B63B 39/06
USPC ............................. 114/39.25, 124, 140, 143
See application file for complete search history.

(56) References Cited

U.S. PATENT DOCUMENTS

| | | | |
|---|---|---|---|
| 2001/0008113 A1* | 7/2001 | Yu | ........................... B63B 43/08 114/143 |
| 2007/0169580 A1 | 7/2007 | Carrier et al. | |
| 2010/0116189 A1 | 5/2010 | Jensen | |

* cited by examiner

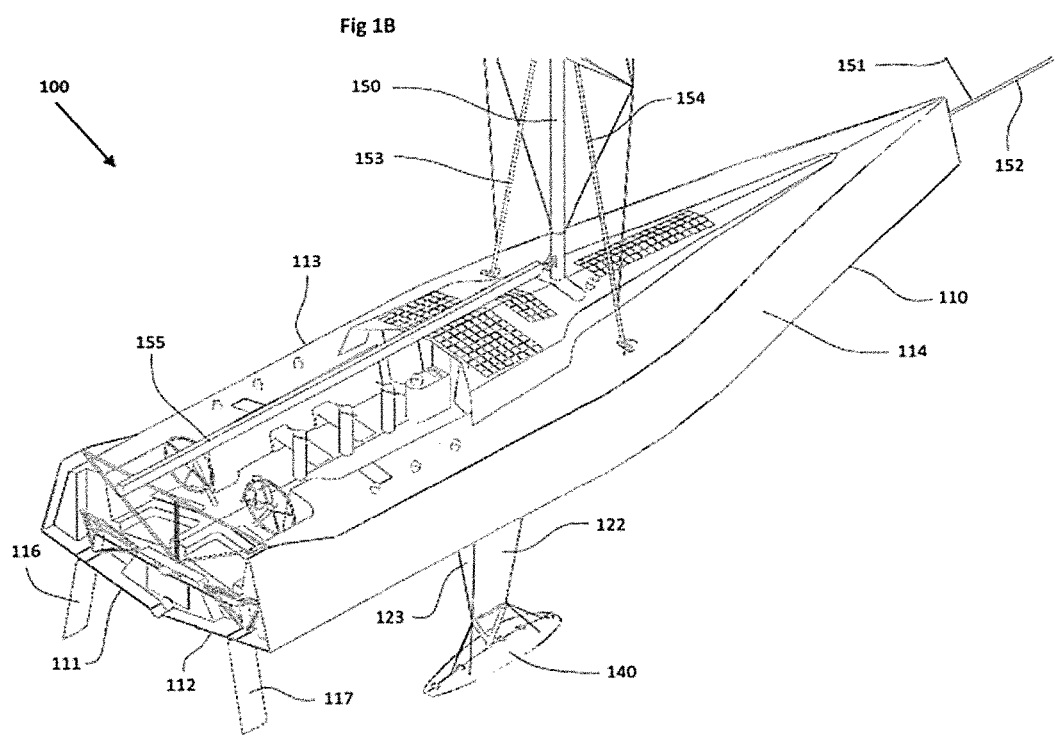

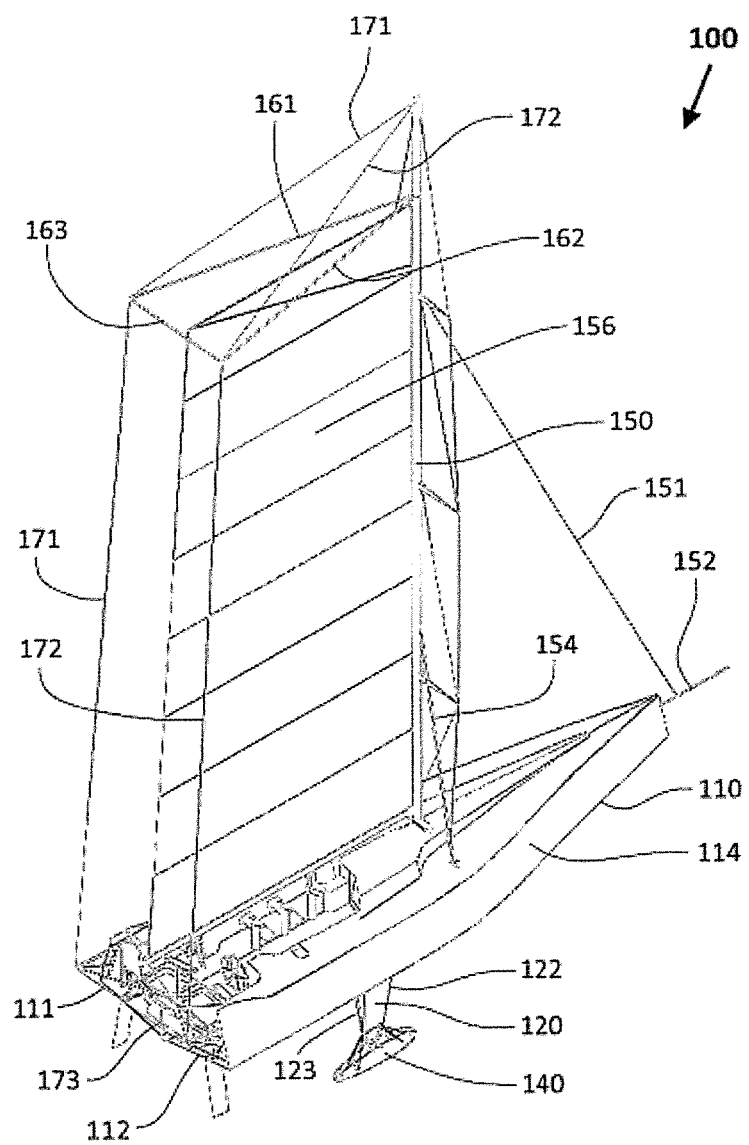

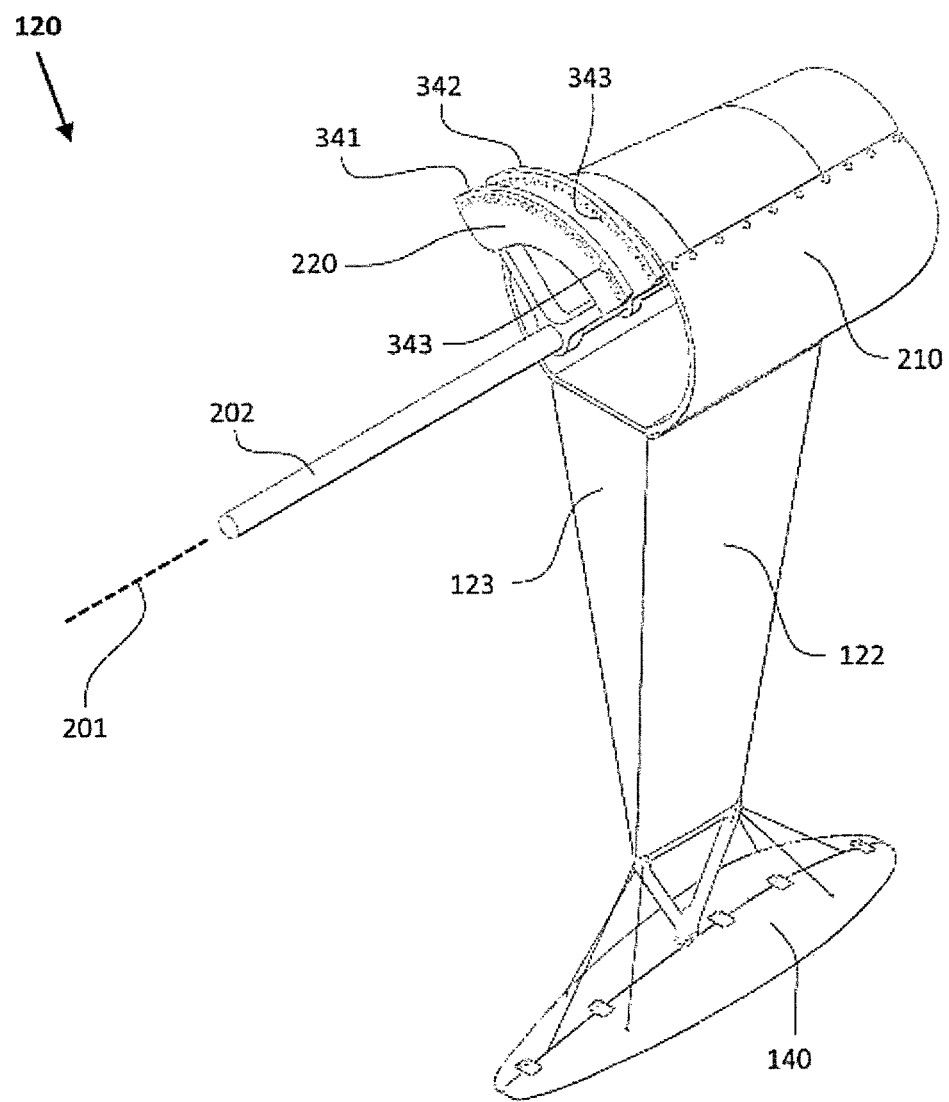

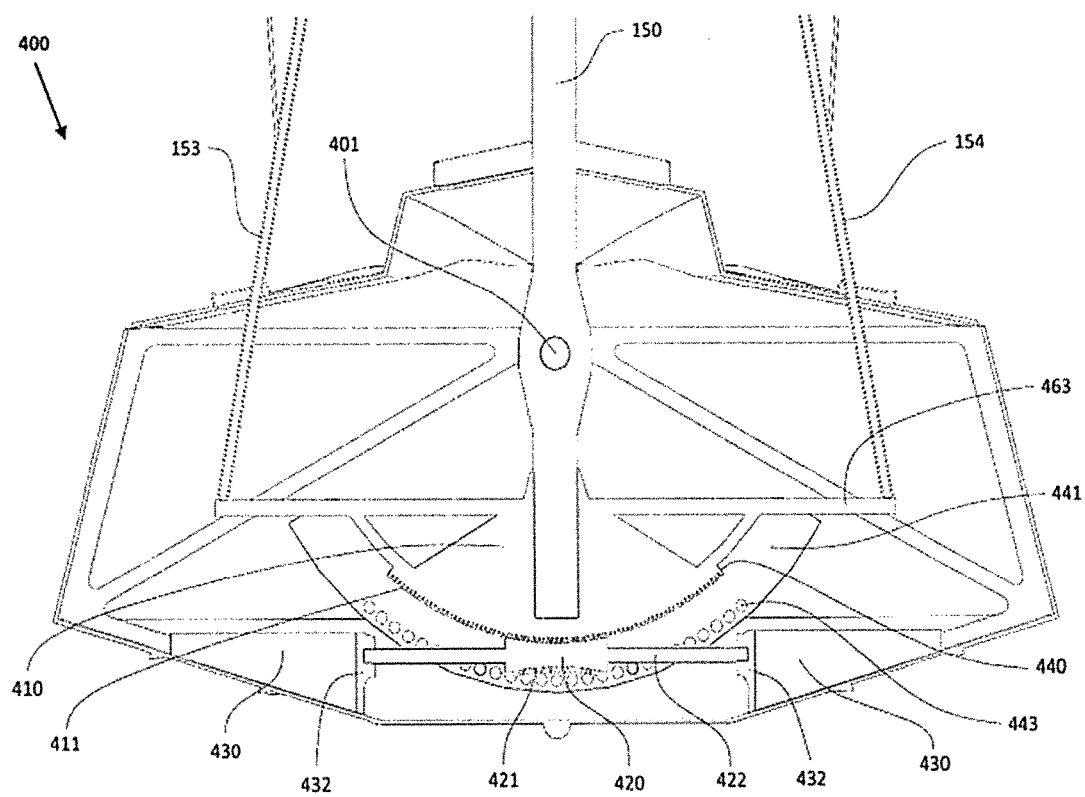

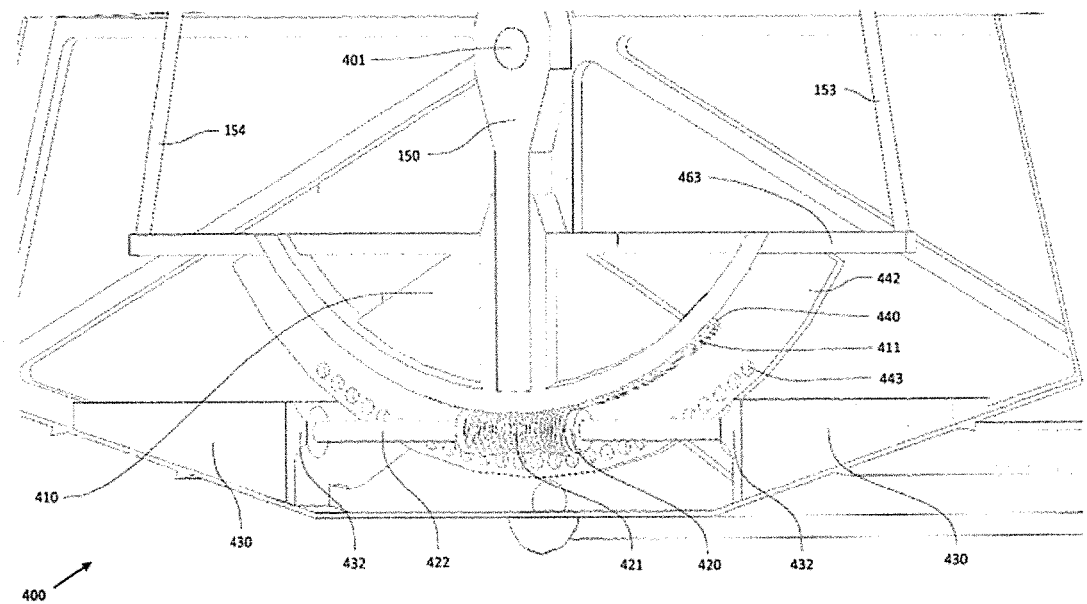

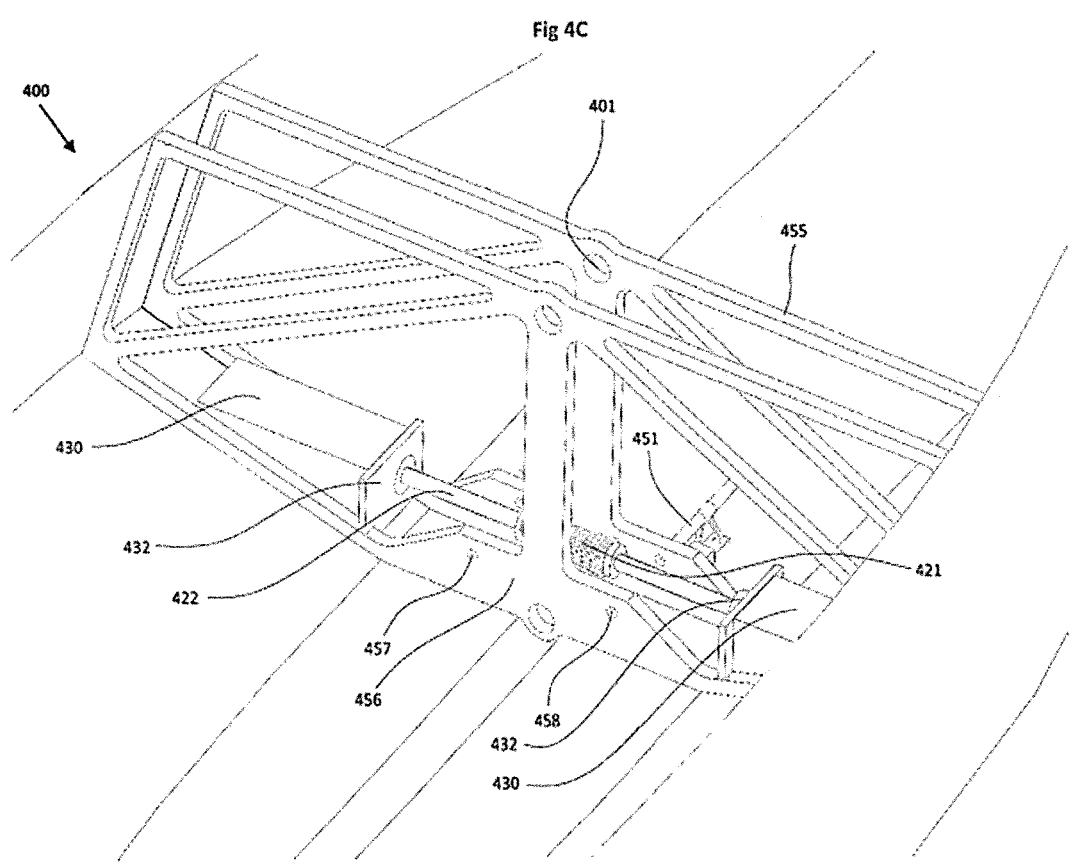

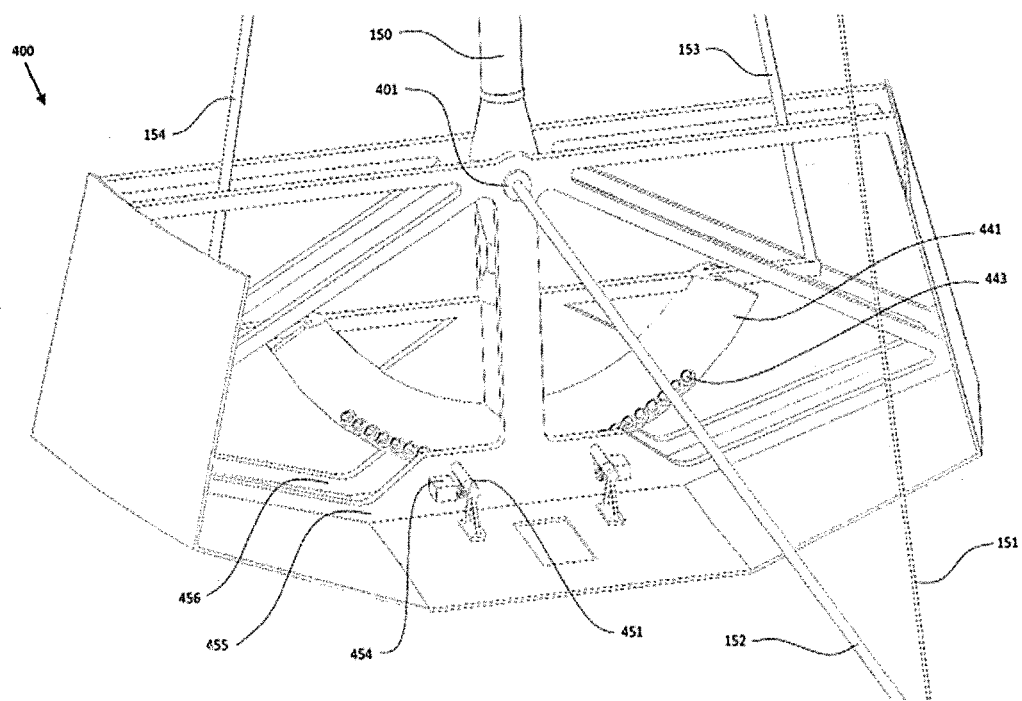

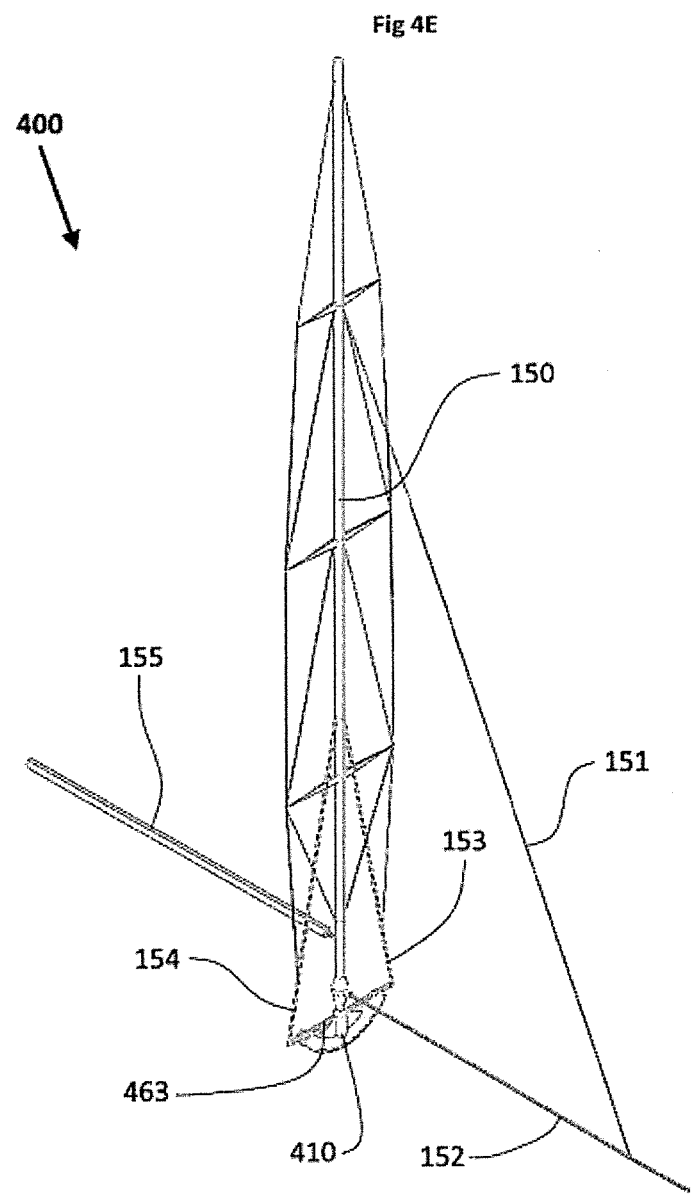

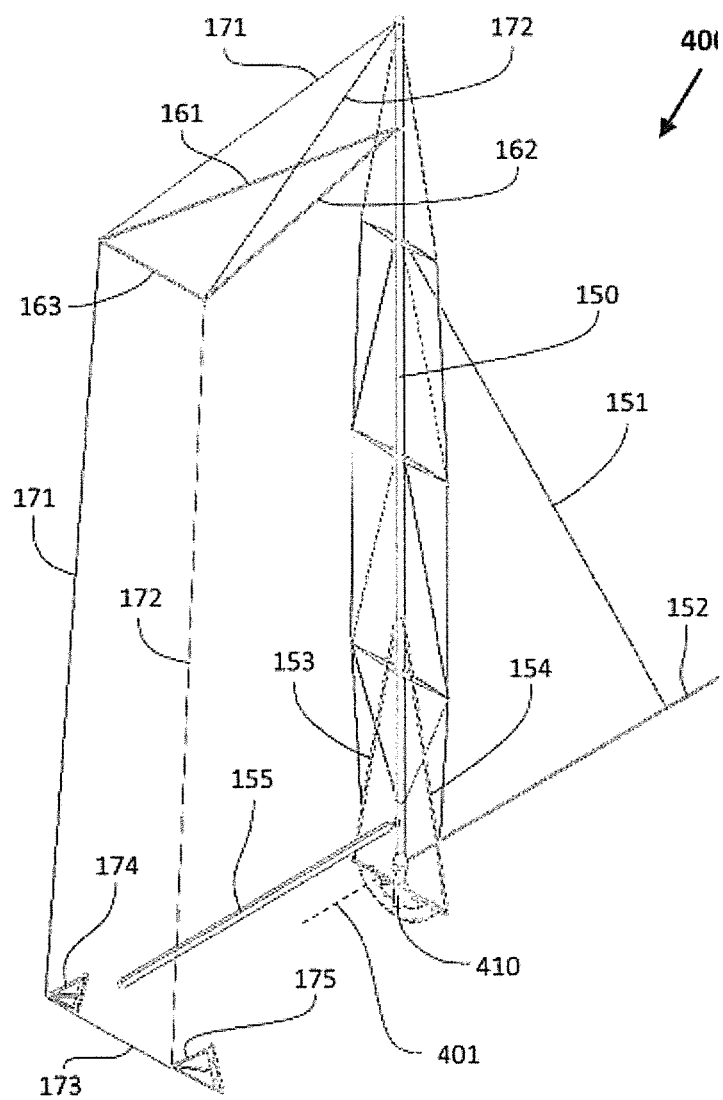

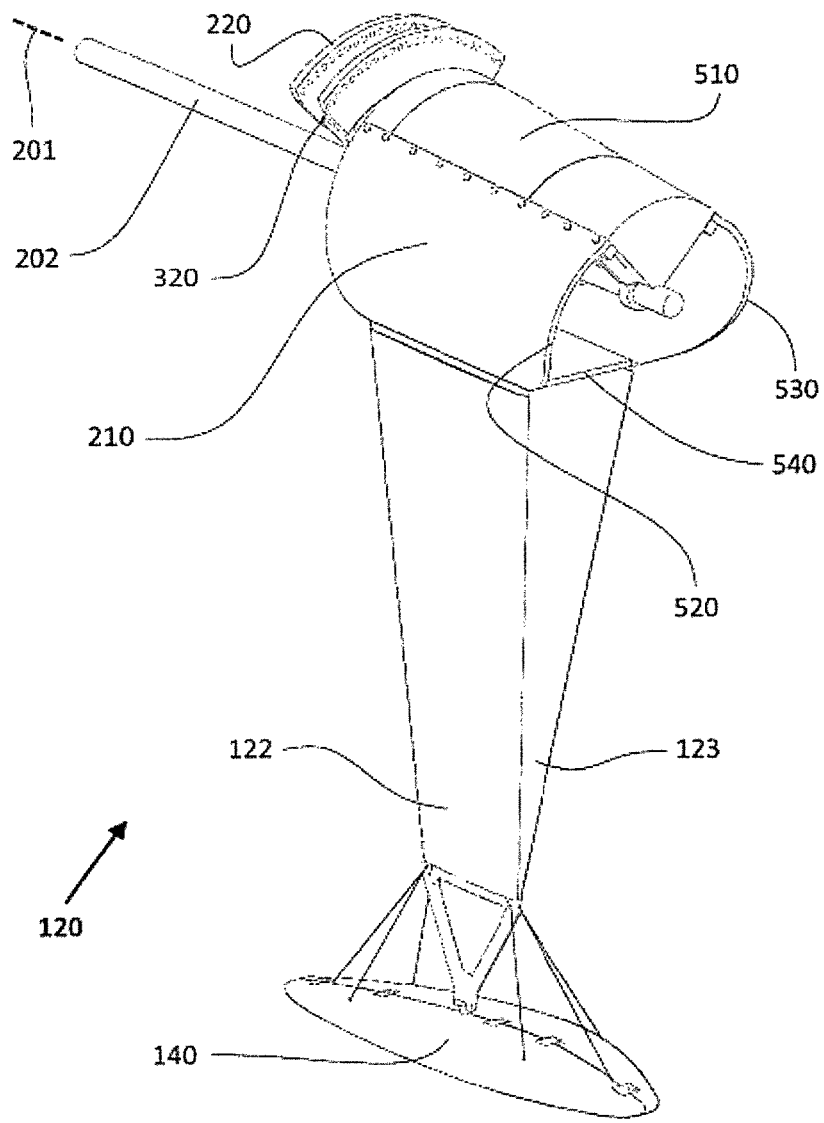

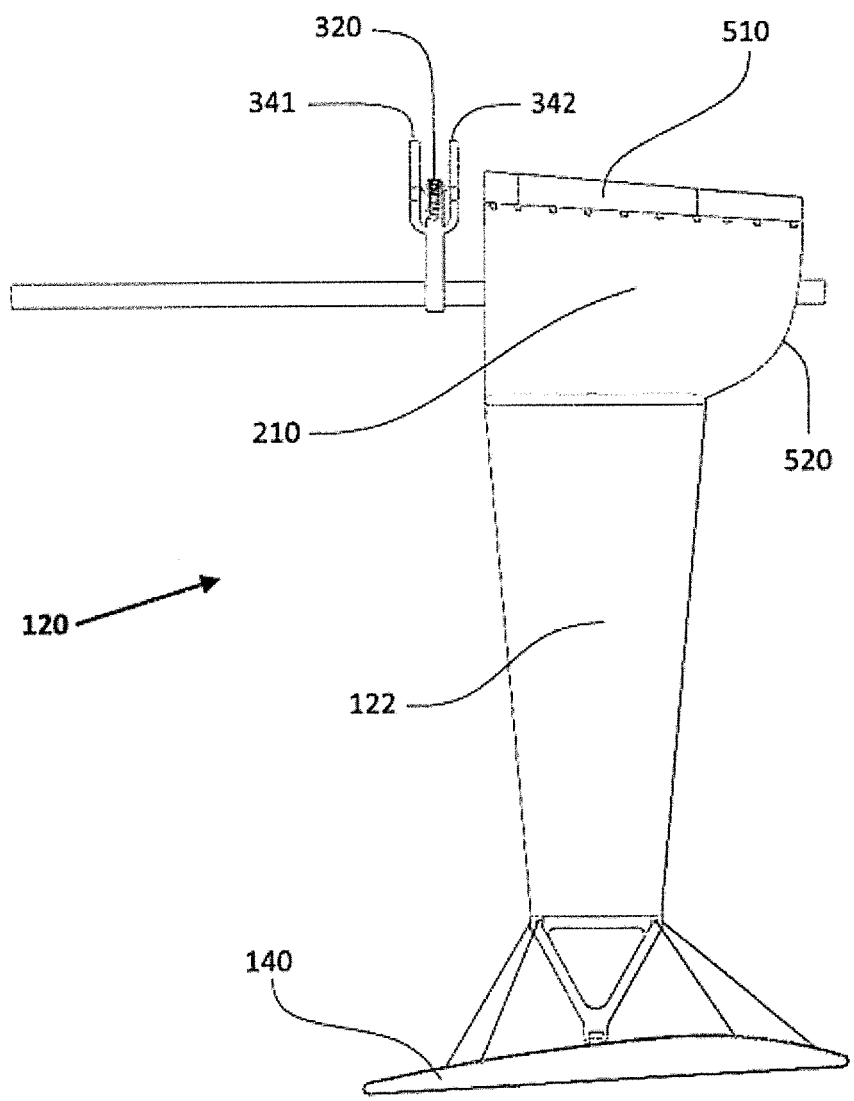

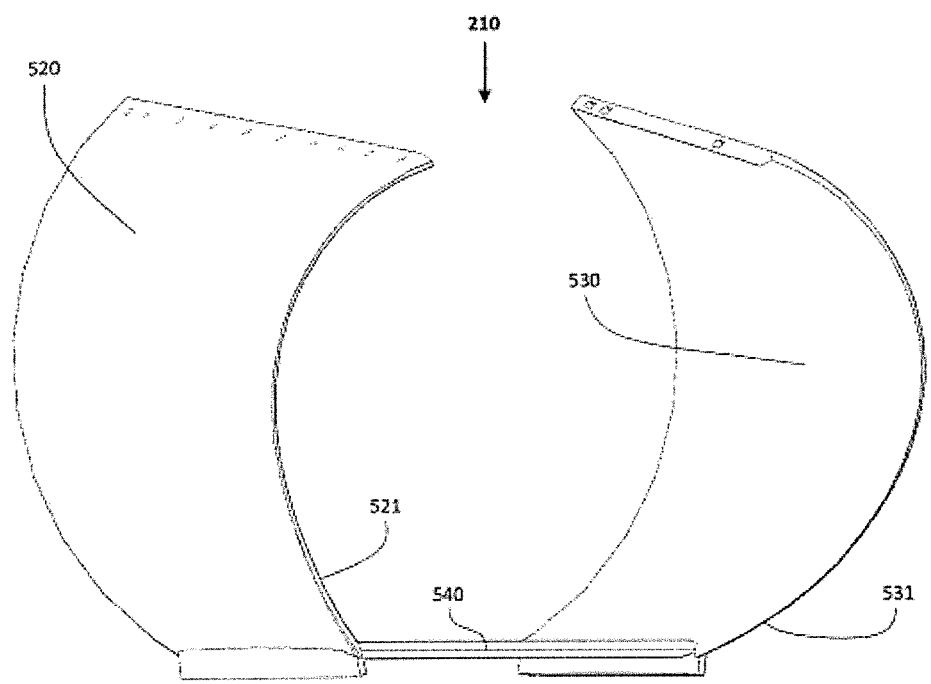

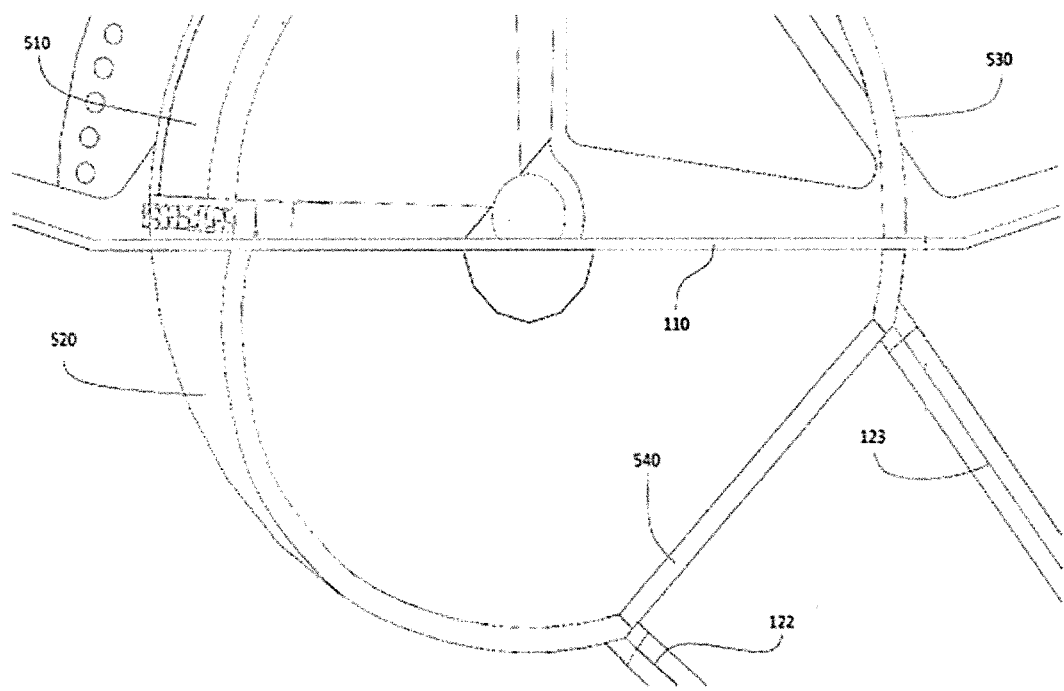

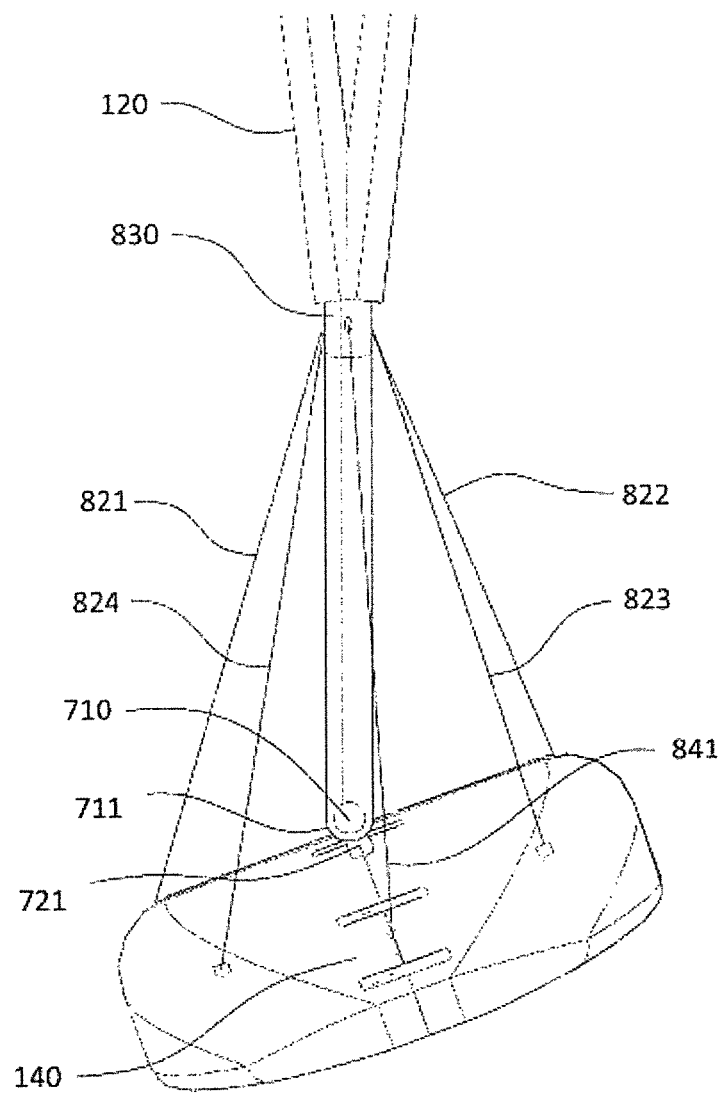

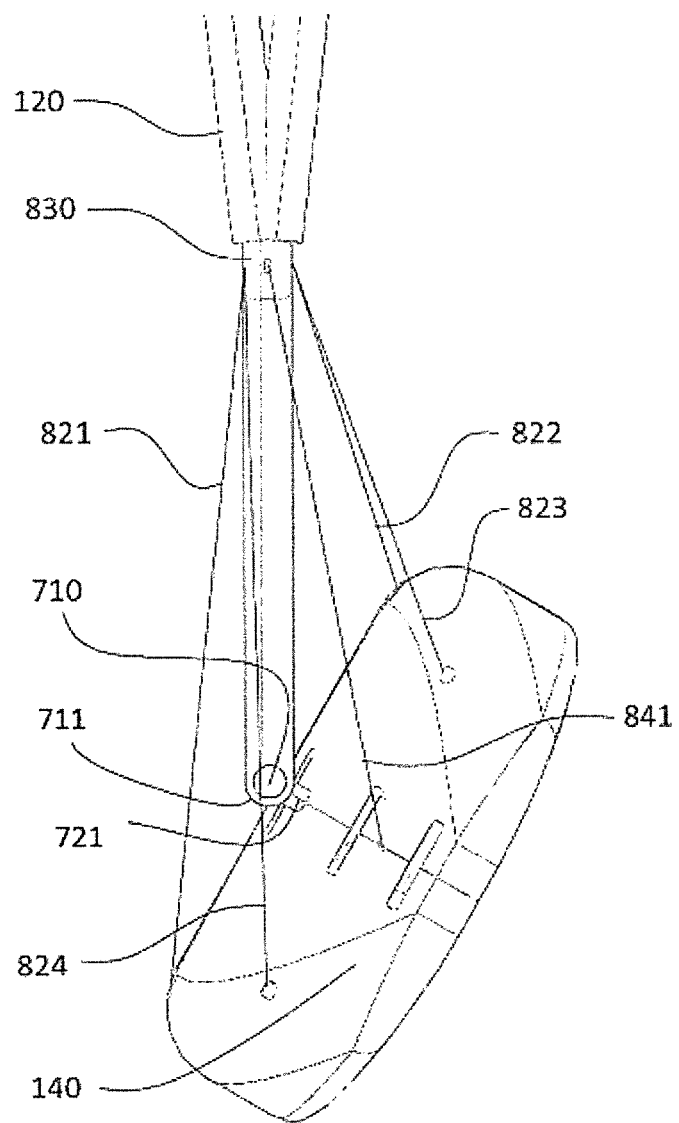

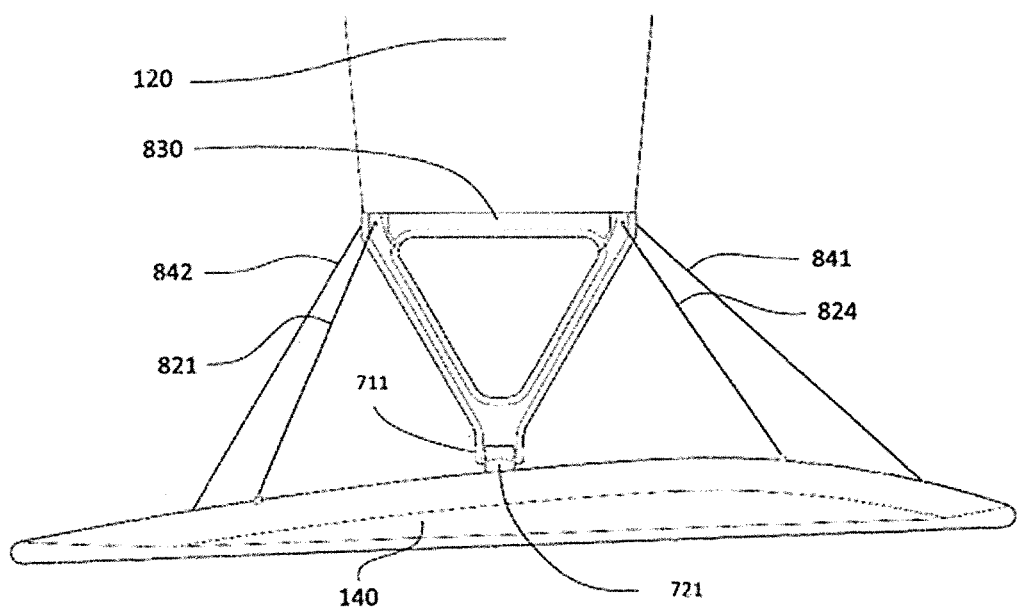

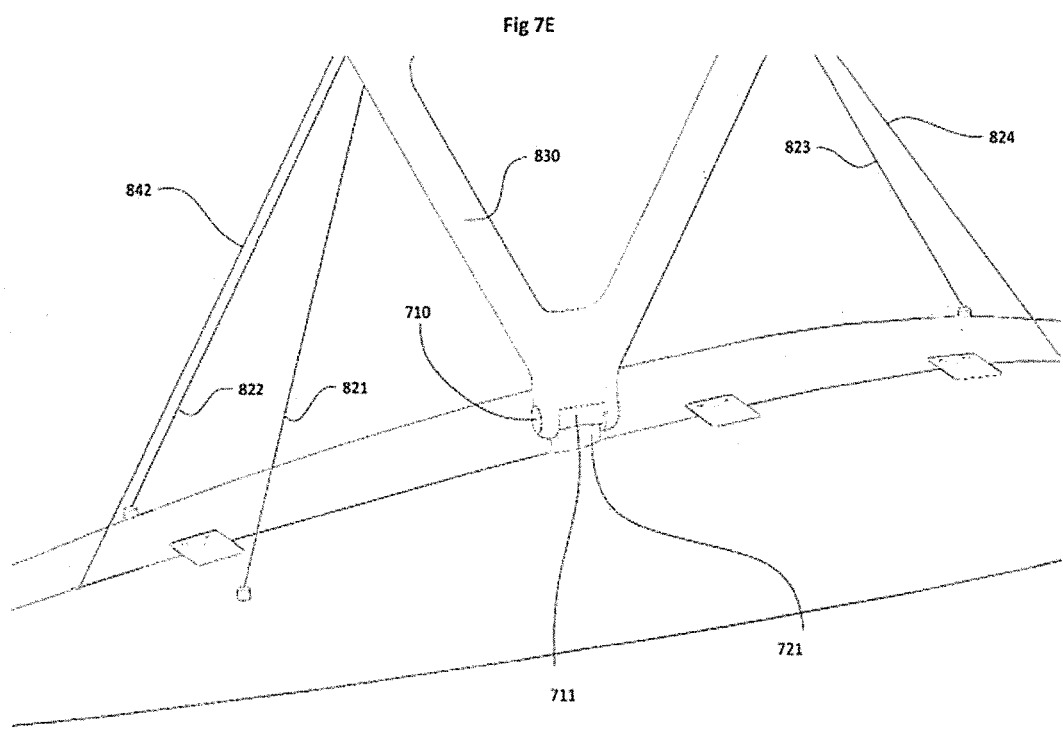

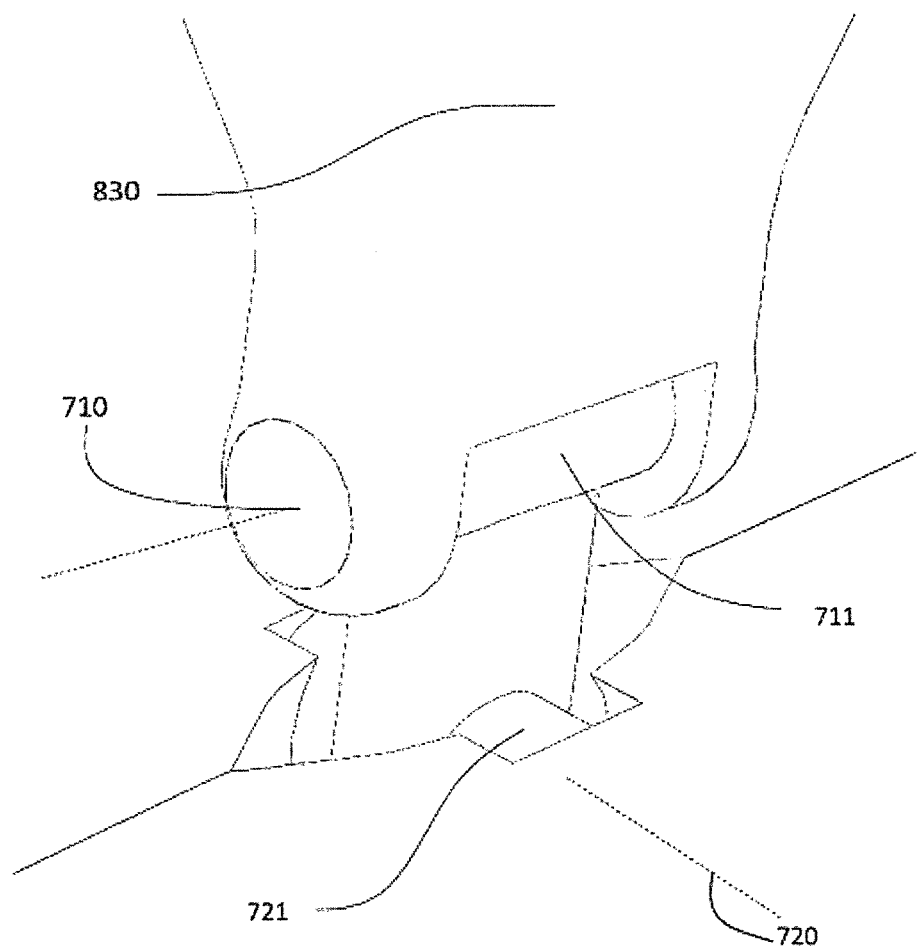

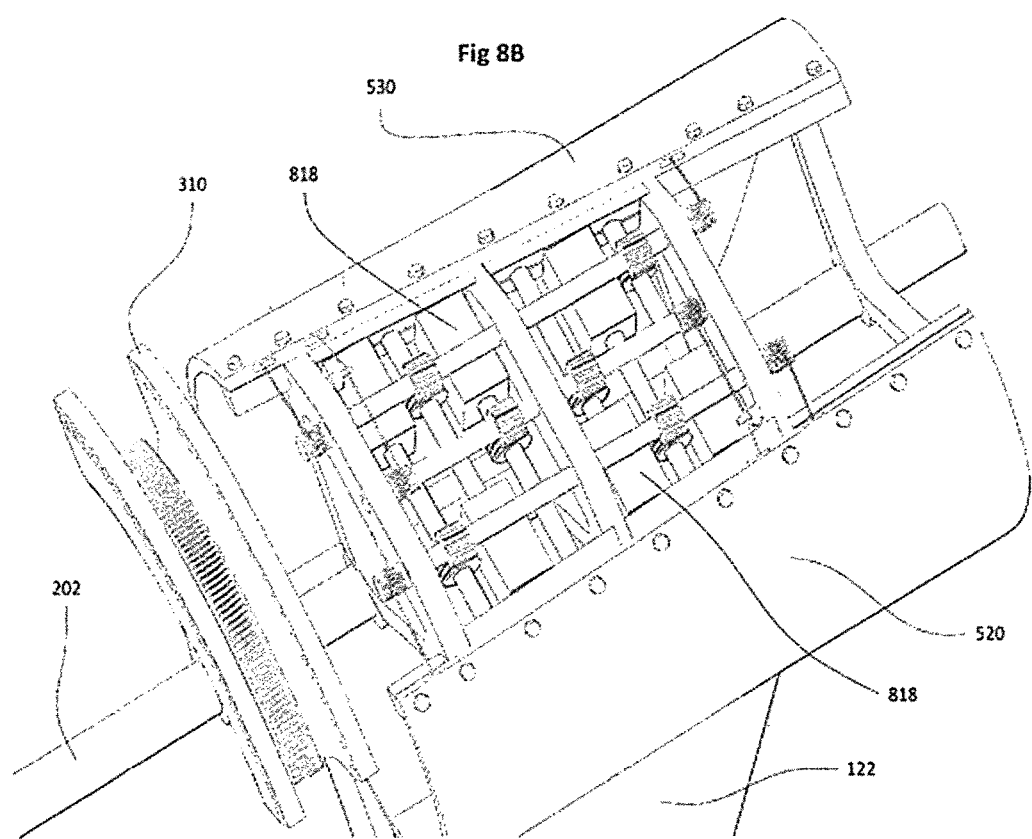

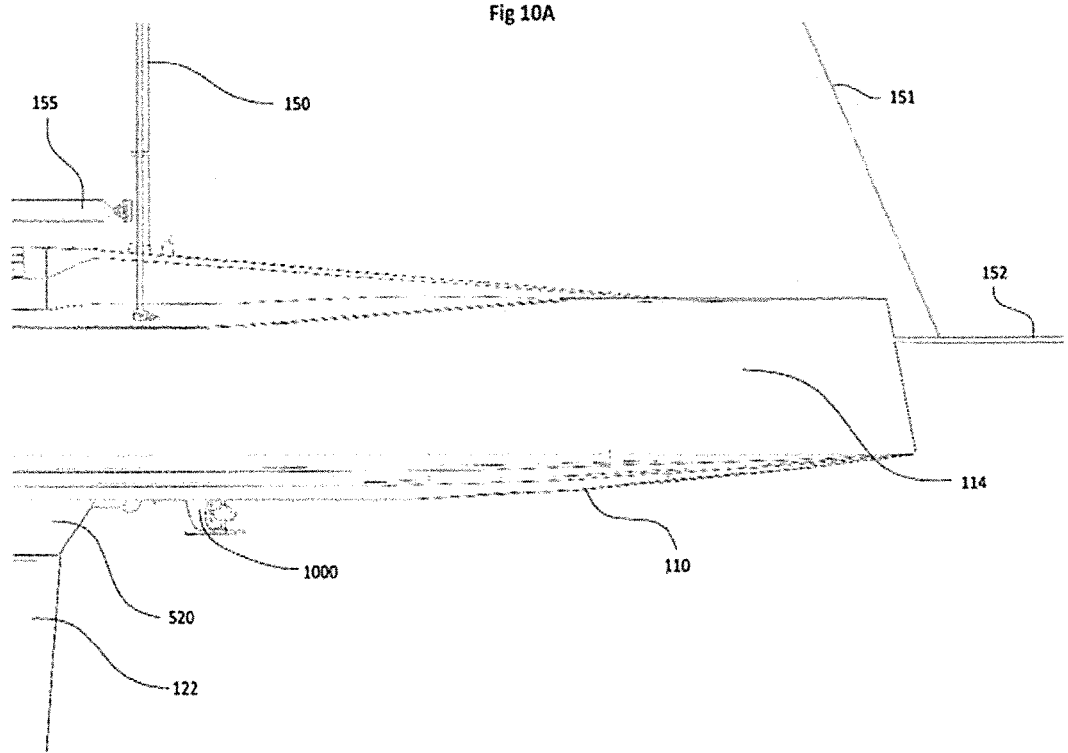

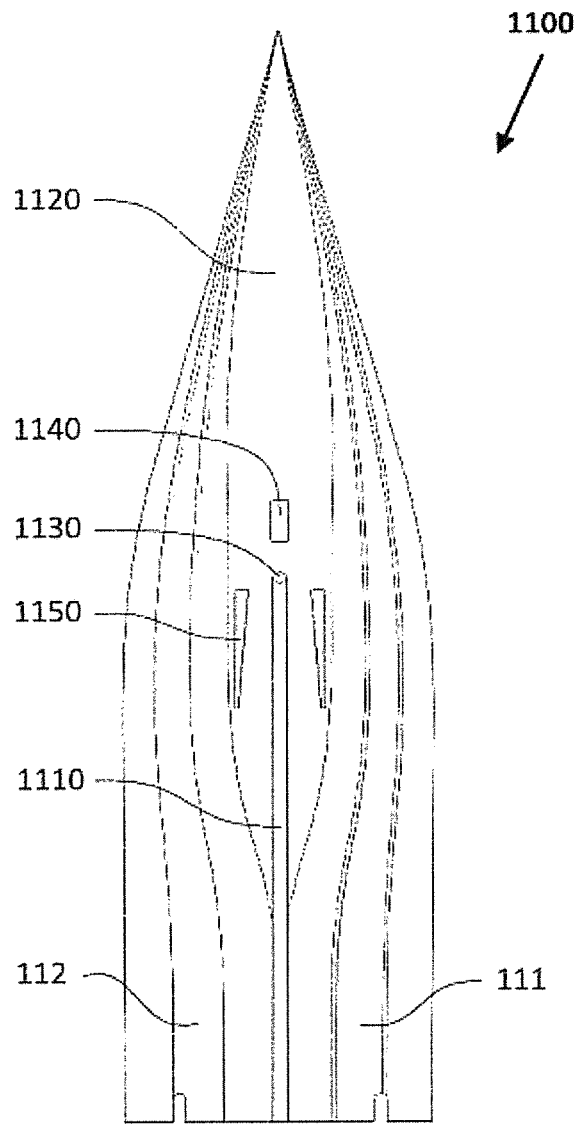

ADJUSTABLE BALLAST BULB FOR A SAILING VESSEL

FIELD OF THE INVENTION

This invention relates to a monohull sailing vessel with sailing vessel apparatus. In particular, it relates to an adjustable ballast bulb for a monohull sailing vessel.

BACKGROUND TO THE INVENTION

Over time sailing vessels' hull design has evolved from 'displacement' hulls with a fixed maximum boat speed consequent on hull being 'pushed' through the water to planing hulls. Planing hulls achieve significantly higher forward velocity by sailing atop or 'planing' on water thereby reducing resistance or drag. Consequent on this increased boat speed was the realisation by naval architects that a keeled sailboat's speed could exceed the wind's velocity. This phenomenon only occurs when vessel is sailed 'off the wind' (as in vessel is aligned at greater than 90° to the direction of the wind). This 'off the wind' attitude is in contrast to a 'close-hauled' attitude, wherein vessel is aligned at less than 90° to the wind's direction.

A further consequence of this ability to exceed wind speed when sailing 'off the wind' being that such vessel would therefore never sail directly downwind as their sails would collapse when vessel's speed attains wind speed (as in 'running' with wind—vessel orientated 180° to wind's direction). Modern sailing vessels therefore always sail either 'off the wind' or 'close-hauled'.

Both these attitudes result in the vessel's hull 'heeling' secondary to the force generated by the wind on the sails. Control of vessel's 'heeling' moment is therefore required.

SUMMARY OF THE INVENTION

According to the present invention there is provided a sailing vessel having a hull, a keel, a mast, a ballast bulb providing ballast at the base of the keel and a control apparatus for controlling adjustment of the ballast bulb in relation to the keel, wherein the control apparatus includes: a first rotating mechanism for rotating the ballast bulb around a lateral axis of the ballast bulb to change the pitch of the ballast bulb in relation to the keel; and a second rotating mechanism for rotating the ballast bulb around a longitudinal axis of the ballast bulb to change the roll of the ballast bulb in relation to the keel.

Said control apparatus can include a pitch actuator and a roll actuator connected to the ballast bulb by means of wires between each quadrant of an upper surface of the ballast bulb and the keel.

The ballast bulb preferably includes a compartment extending longitudinally within the ballast bulb and a movable mass housed within the compartment and movable longitudinally in the compartment to alter the ballast distribution in the ballast bulb. There can be at least one further compartment in the ballast bulb which is accessible when the sailing vessel is out of the water.

A keel canting mechanism can be provided for varying the angle of the keel about a longitudinal axis of the sailing vessel. When such a mechanism is provided it can include a worm gear co-axial with the axis of rotation of the keel, a worm and a driving means for driving the worm. There can be a lock for locking the worm gear in the position to which it has been adjusted. In a specific form said worm gear has a plurality of apertures therein through which one or more pins can be inserted to lock the worm gear in the position to which it has been moved by the worm.

Said worm is preferably a double-enveloping worm.

It is also possible to provide the sailing vessel with a mast canting mechanism for varying the angle of the mast about a longitudinal axis of the sailing vessel, the mast canting mechanism including a mast shifting worm gear co-axial with the longitudinal axis about which the mast rotates, a mast shifting worm and means for driving the mast shifting worm. A lock can be provided for locking the mast shifting worm gear in the position to which it has been moved by the mast shifting worm. It is preferred that the mast shifting worm be a double enveloping worm.

Said mast shifting worm gear can have a plurality of apertures therein through which one or more pins can be inserted to lock the mast shifting worm gear in the position to which it has been moved by the mast shifting worm.

The keel canting mechanism and the mast canting mechanism are desirably spaced apart fore and aft in the sailing vessel.

In the preferred form the keel canting mechanism comprises a generally cylindrical or truncated conical housing extending axially of said longitudinal axis and from which the keel depends, the generally cylindrical or truncated conical housing being hollow and a superior portion being within the hull of the sailing vessel, the generally cylindrical or truncated conical housing having opposing lateral sides which are profiled from fore to aft whereby one of the lateral sides acts as a foil promoting lateral resistance in the water when the keel is canted and that lateral side has rotated to below the hull of the sailing vessel.

A watertight enclosure affixed and sealed to the interior surface of the hull and which surrounds said generally cylindrical or truncated conical housing can be provided.

The sailing vessel can include a shaft about which the keel rotates, said shaft extending aft of the keel.

Where such a shaft is provided a sonar housing for a forward-scanning sonar scanner is desirably disposed forward of the shaft of the keel canting mechanism.

A first rigid rigging arrangement formed of the mast and triangular stays which articulates with a rigging canting mechanism can be provided. A second rigging arrangement which is triangular and rigid between the mast, an extended bowsprit and a forestay can also be provided.

In a still further form a rigid topmast spreading arrangement is provided in the form of port and starboard topmast sprits having first ends connected to the mast and having their second ends braced apart by a topmast spar, and a closed-loop backstay arrangement from the top of the mast via the second ends of the topmast sprits and a backstay link at the stern of the sailing vessel.

The sailing vessel's hull can be hard chined and have a port semi-hull chine and a starboard semi-hull chine whereby the sailing vessel can be heeled to sail on an even-keel on either the port or starboard semi-hull chine. It is possible to provide sheer strakes substantially perpendicular to the port semi-hull chine and the starboard semi-hull chine.

The sailing vessel's hull and its deck are desirably configured such that, when the leeward semi-hull is on an even-keel, the windward hemi-deck and hemi-cockpit surfaces are parallel to the waterline.

As part of the sailing vessel's equipment a retractable propulsion system can be disposed forward of the mast.

A water-making apparatus using a reverse osmosis pump driven by either a helmsman's weight standing on a hinged pedestal or a crew member's weight sitting on a hinged seat can be incorporated into the structure of the vessel.

BRIEF DESCRIPTION OF THE DRAWINGS

The invention will now be described, by way of example only, with reference to the accompanying representations in which:

FIG. 2 is a perspective view of a keel arrangement in accordance with aspects of the present invention;

FIG. 4A is a cross-sectional view a mast mechanical canting mechanism in accordance with an aspect of the present invention;

FIG. 4B is a cut-away perspective view of the mast mechanical canting mechanism of FIG. 4A;

FIG. 4C is a further perspective view of the mast mechanical canting mechanism of FIG. 4A;

FIG. 4D is another front perspective view of the mast mechanical canting mechanism of FIG. 4A;

FIG. 4E is a perspective view of the mast mechanical canting mechanism in isolation from the sailing vessel with the first embodiment of the rigging arrangement;

FIG. 4F is a perspective view of the mast mechanical canting mechanism in insolation from the sailing vessel with the second embodiment of the rigging arrangement;

FIG. 5A is a perspective view of a keel arrangement in accordance with aspects of the present invention;

FIG. 5B is a side view of the keel arrangement of FIG. 5A;

FIG. 6A is a perspective view from the front of a generally cylindrical or truncated conical housing of a keel arrangement in accordance with an aspect of the present invention;

FIG. 6C is front view of the generally cylindrical or truncated conical housing of FIG. 6A, wherein keel is canted at 45°;

FIG. 7A is a front view of a ballast bulb in a first rotated position of a roll rotation in accordance with an aspect of the present invention;

FIG. 7B is a front view of the ballast bulb of FIG. 7A in a second rotated position of a roll rotation;

FIG. 7C is a side view of the ballast bulb of FIG. 7A in a first rotated position of a pitch rotation in accordance with an aspect of the present invention;

FIG. 7E is a perspective view of the axes of rotation of the ballast bulb of FIG. 7A;

FIG. 7F is a cut-away perspective view of the axes of rotation of the ballast bulb of FIG. 7A;

FIG. 8B is a perspective view of the control mechanism of FIG. 8A;

FIG. 10A is a side view of a propulsion system in accordance with an aspect of the present invention;

FIG. 11A is an underside view of a hull in accordance with an aspect of the present invention;

DETAILED DESCRIPTION WITH REFERENCE TO THE DRAWINGS

Figure 1A:
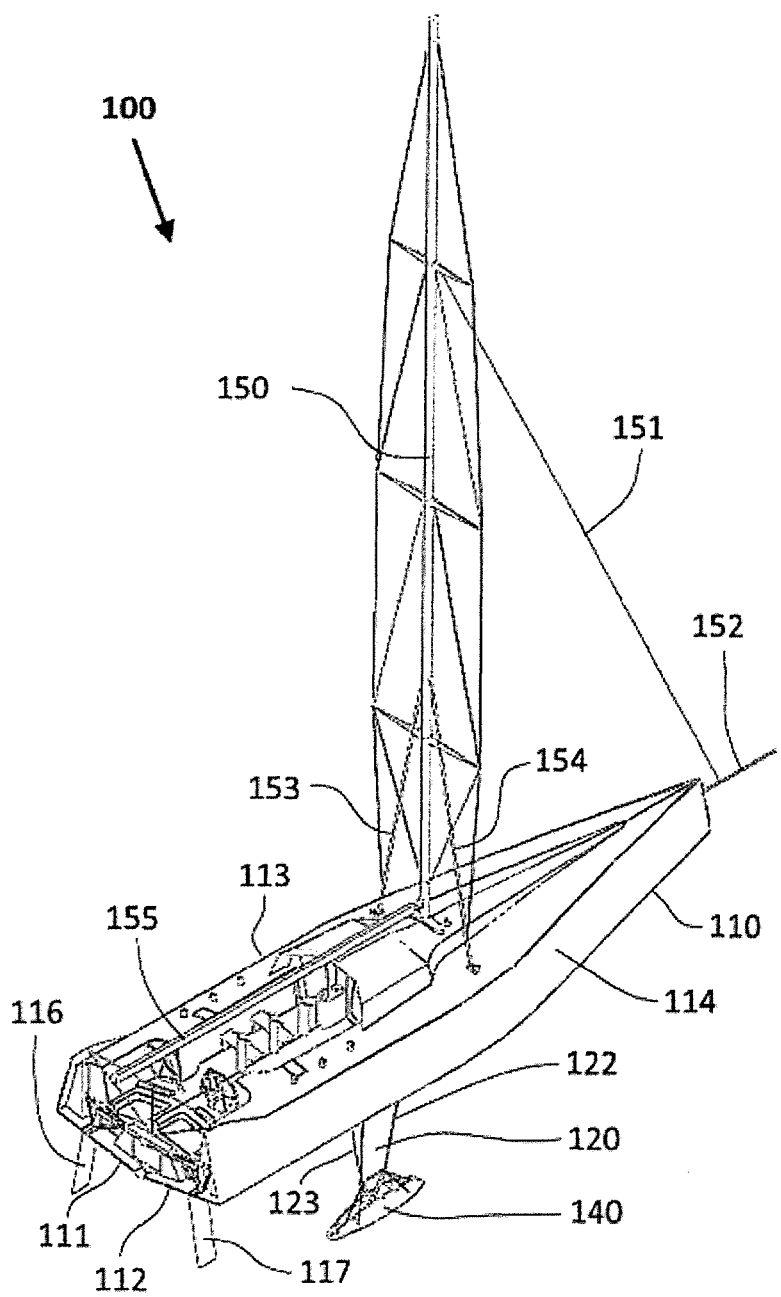
FIG. 1A is a perspective view from the rear of a sailing vessel in accordance with a first embodiment of the present invention.
Figure 1C:
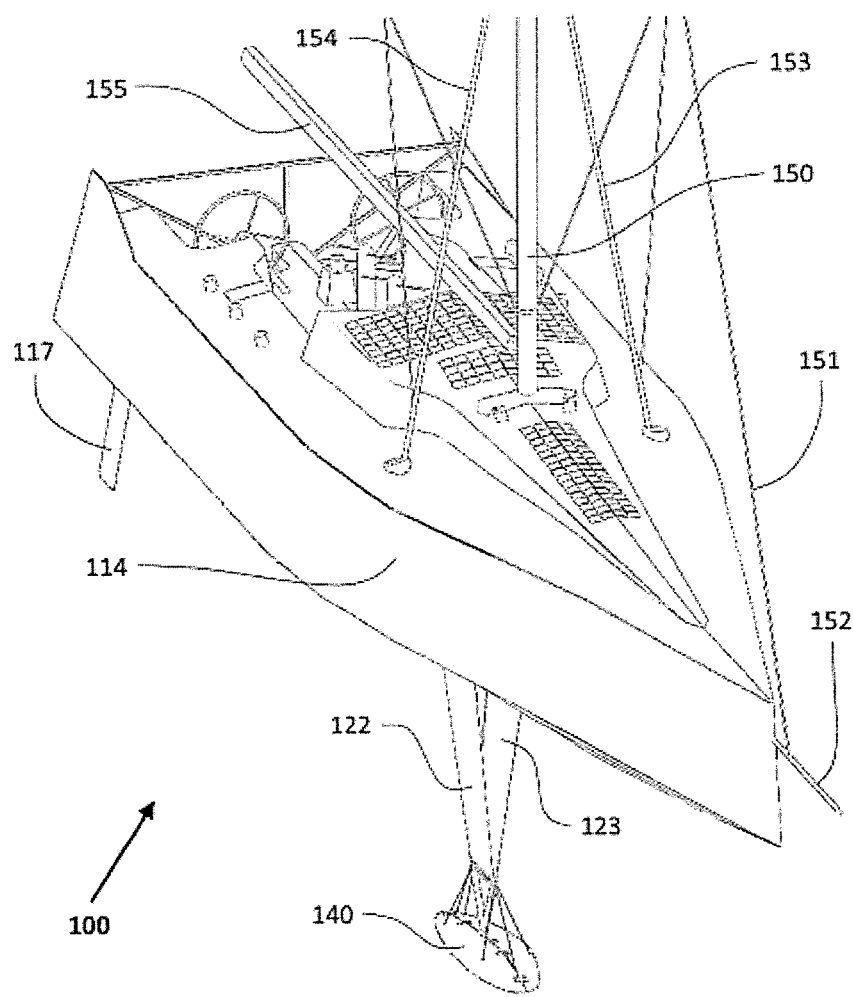
FIG. 1C is a perspective view from the front of the sailing vessel of FIG. 1A.

A sailing vessel, various sailing vessel apparatus and additional aspects are described herein. It should be appreciated that some of the apparatus and aspects may be used in combination or as stand-alone apparatus.

Referring to FIGS. 1A to 1D, a sailing vessel (100) is shown. The sailing vessel (100) may be of any practical size, which may be powered in part or fully by wind, including a mega-yacht, super-yacht, medium yacht, small-yacht, dinghy sailing yacht, or a scaled model sailing vessel with remote control. FIGS. 1E to 1J show a sailing vessel (100) with a rigging arrangement including a backstay arrangement which is described further with respect to FIG. 4F.

The sailing vessel (100) includes a ballast bulb (140) which may be articulated. The ballast bulb (140) and its associated features is described with reference to FIGS. 7A to 7F, FIGS. 8A and 8B, and FIGS. 9A and 9B. Additional features of a sailing vessel (100) are described herein which may optionally be used in combination with the described adjustable ballast bulb (140). However, it should be understood that an adjustable ballast bulb (140) as described may be used with other sailing vessels of varying design.

The adjustable ballast bulb (140) may be used with a sailing vessel with a non-canting keel, or with a sailing vessel including hydraulic canting keels or mechanical canting keels. A particular embodiment of a mechanical canting keel is described as an example embodiment.

The ballast bulb may be "hydrofoiled" in that the alignment and 'angle-of-attack' are adjustable. The ballast bulb may be rotatable around a long axis and inclined to its horizontal plane variable. Rotation around long axis allows an operator to direct the vector of force generated by foil's forward movement through water, between either raising hull superiorly (lifting out water) and/or as 'righting moment'. The quantity of this "lift" (or force) may be adjusted by the operator increasing or decreasing foil's 'angle-of-attack'.

The sailing vessel (100) may have a hull (110) which is hard-chined with a port semi-hull chine (111) and a starboard semi-hull chine (112) to provide a bi-planer-type configuration of a monohull. Sheer strakes (113, 114) substantially perpendicular to the port and starboard semi-hull chines (111, 112) may be provided respectively. This is an example embodiment of a hull (110) form and other forms may also be provided.

Additional to the concept are multiple adjustable devices that function collectively to maintain either port or starboard semi-hull of the bi-planer monohull on an even-keel. Control of the vessel's 'heeling' moment may be provided via multiple adjustable devices. Adjustments may be made such that vessel's hull aims to remain on an even-keel at all times. One of these forms of control is provided by the adjustable ballast bulb (140).

A component of the design is the reconfiguration of the monohull sailing vessel's hull design such that a unitary hull incorporates two distinct/separate planing 'semi-hulls', port and starboard. When sailed, the sailing vessel's orientation to the water is such that either port or starboard semi-hull is maintained on an even-keel parallel to the water's surface. This is achieved by multiple controls both traditional and as described. The adjustments thereto, countering the 'heeling moment' of the hull secondary to wind pressure on the sails. Traditional control of a sailing vessel's heeling moment is achieved through adjustments made to sails, ballast and steerage. This description includes additional apparatus for adjusting righting moment.

The sailing vessel (100) may have a keel arrangement (120) which cants around an axis of rotation running longitudinally fore and aft of the sailing vessel (100).

Figure 1D:
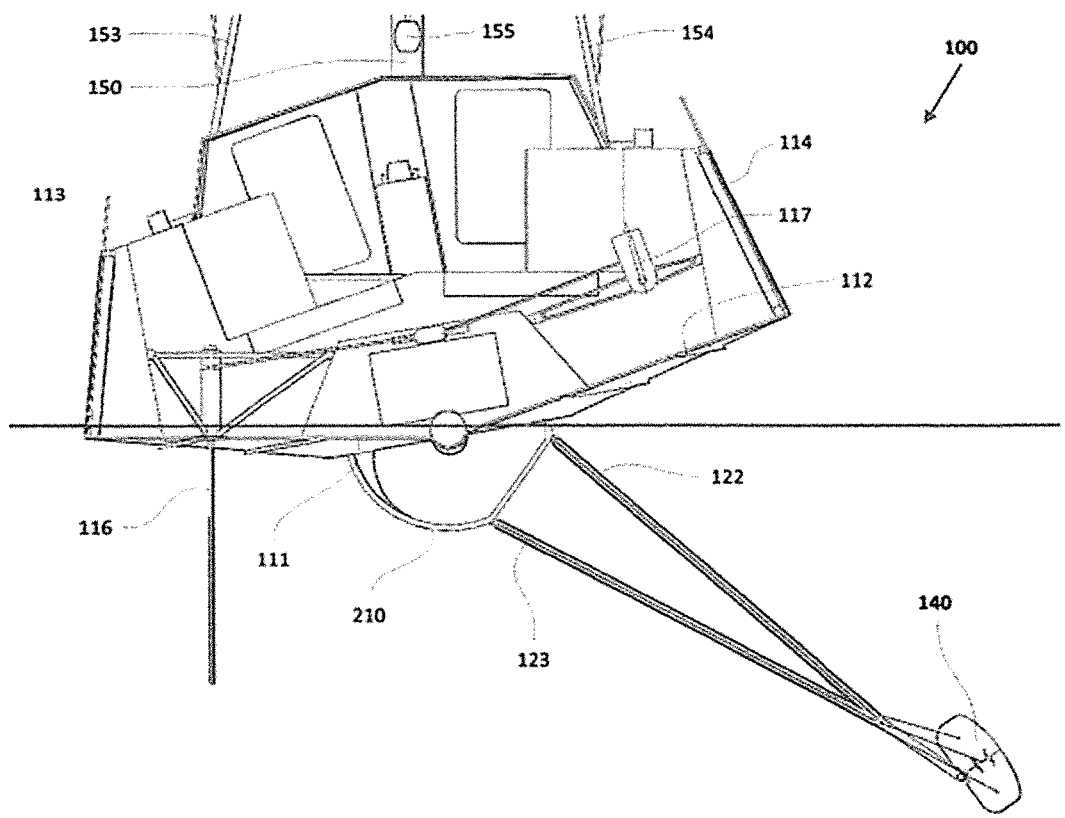
FIG. 1D is a rear view of the sailing vessel of FIG. 1A showing the keel in a canted position.
Figure 1E:
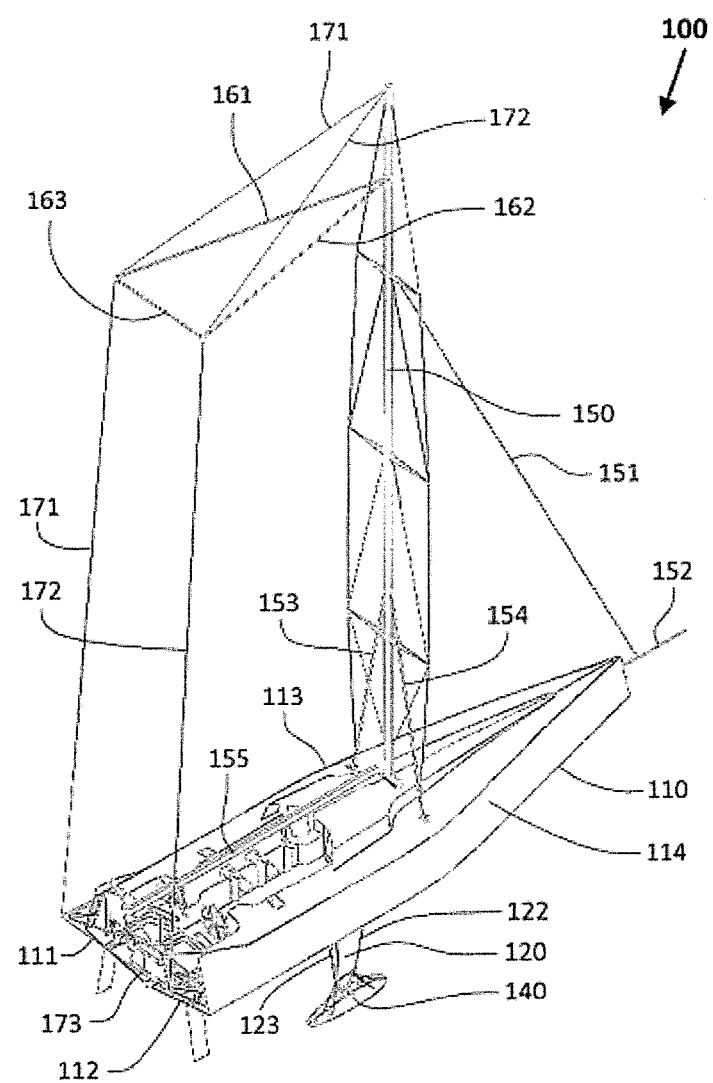
FIG. 1E is a perspective view from the rear of a sailing vessel in accordance with a second embodiment of the present invention having an alternative rigging arrangement.
Figure 1G:
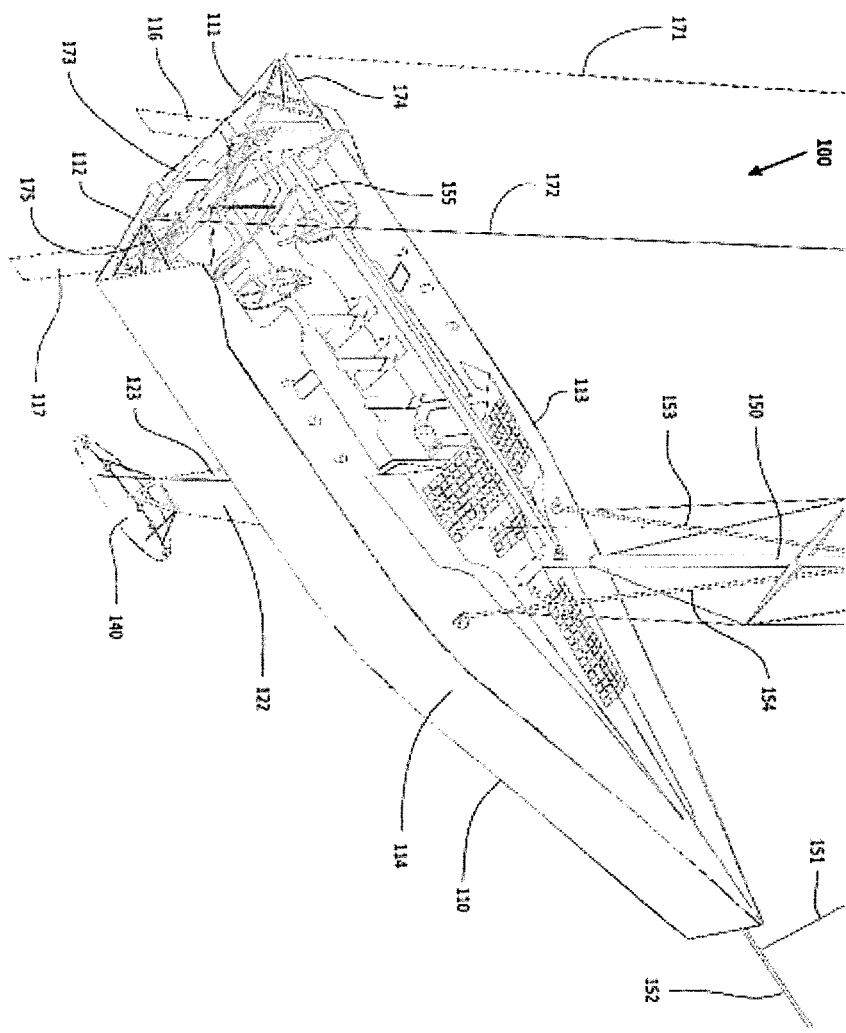
FIG. 1G is an enlarged view of FIG. 1E.

FIG. 1D shows the sailing vessel (100) including a keel arrangement (120) shown in a canted position. This figure also shows that the sailing vessel (100) may include conventional port and starboard rudders (116, 117) which may be retractable depending on the canted position of the keel arrangement (120). The adjustable ballast bulb (140) is also shown in this figure in a rotated position illustrating the effect of the adjustability of the ballast bulb (140).

The keel arrangement (120) is canted by a keel mechanical canting mechanism which is described further below with reference to FIGS. 2, 3A, 3B and 3C.

The keel arrangement (120) may be configured as a triangle. The base of triangle articulates superiorly with a canting mechanism and the apex of the triangle inferiorly with a ballast bulb hydrofoil. The canting mechanism articulates with and rotates around a shaft located in a semi-circular recess of vessel's bilge. Port and starboard keel-fins constitute the arms of triangle.

The described canting keel arrangement is powered by a linear worm-gear actuator which has the advantage when compared to a hydraulic-powered canting keel, that a worm-gear actuator has high static loading capacity. The worm-gear actuator has a low holding load, which is the force applied to the actuator when not in motion. The consequence of a high static loading capacity is that, once the keel arrangement is positioned in a canted position, it requires no energy to maintain this attitude. The worm of the worm-gear actuator must rotate to move the keel arrangement and in this regard it can be considered self-locking.

The sailing vessel (100) includes a mast (150) which may also be able to cant in relation to the hull (110). A mast mechanical canting mechanism may be provided which is described further below with reference to FIGS. 4A to 4F.

A first embodiment of an arrangement of the rigging of the sailing vessel (100) may be provided with an arrangement of two triangular structures shown in FIG. 4E. The first triangular structure may be formed of the mast (150), forestay (151) and an extended bowsprit (152) which may be rigid or semi-rigid. The second triangular structure may be formed of the mast (150) and the port and starboard triangular stays (153, 154) which are formed of rigid rods. An arc of rotation of approximately 40 degrees may be provided. The rigid rods may be of profiled solid metal, round bar or tubular sections.

Figure 1H:
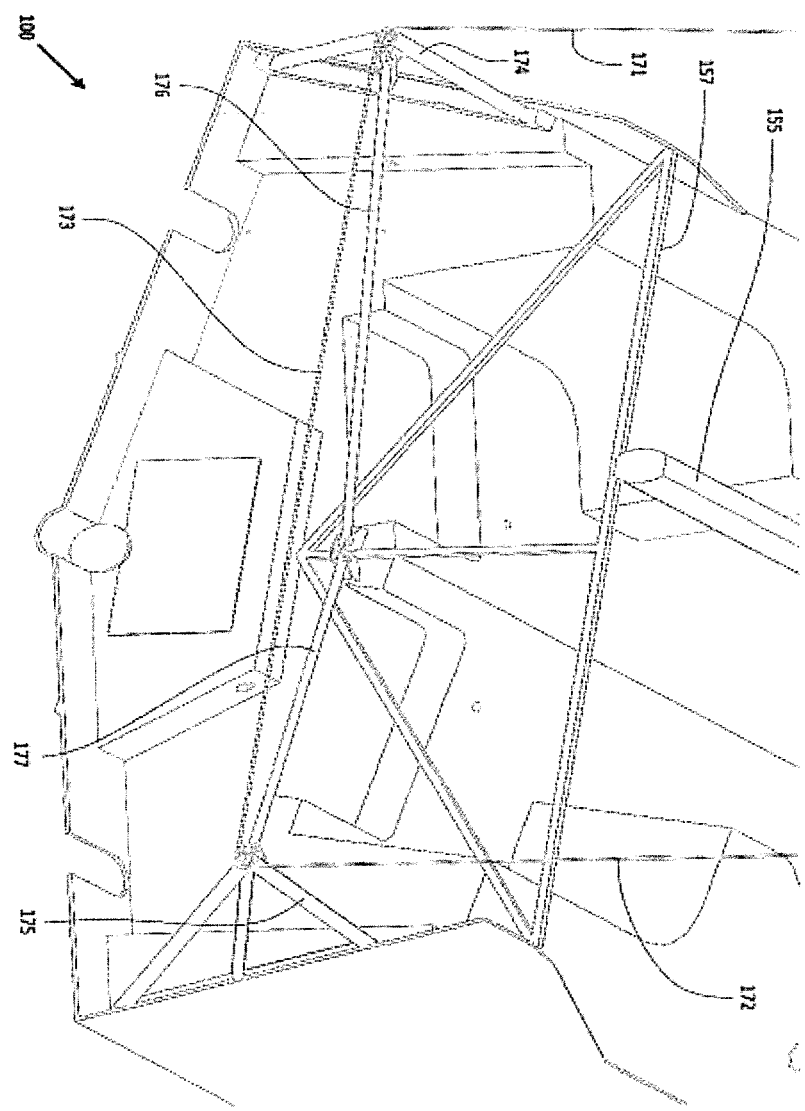
FIG. 1H is a further enlarged view of FIG. 1E showing the rear of the sailing vessel.
Figure 1L:
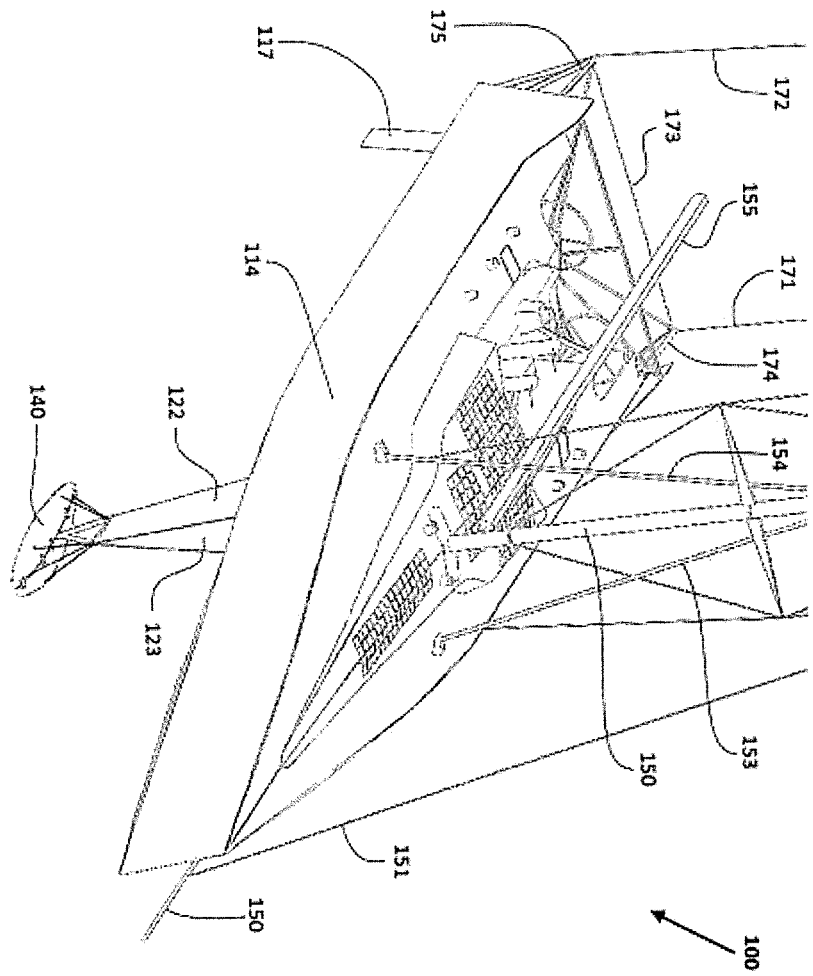
FIG. 1B is an enlarged view of FIG. 1A.
FIG. 1F is the view of FIG. 1E showing a mainsail.
FIG. 1I is a perspective view from the front of the sailing vessel of FIG. 1E.
FIG. 1J is a side view of the sailing vessel of FIG. 1E.
Figure 1J:
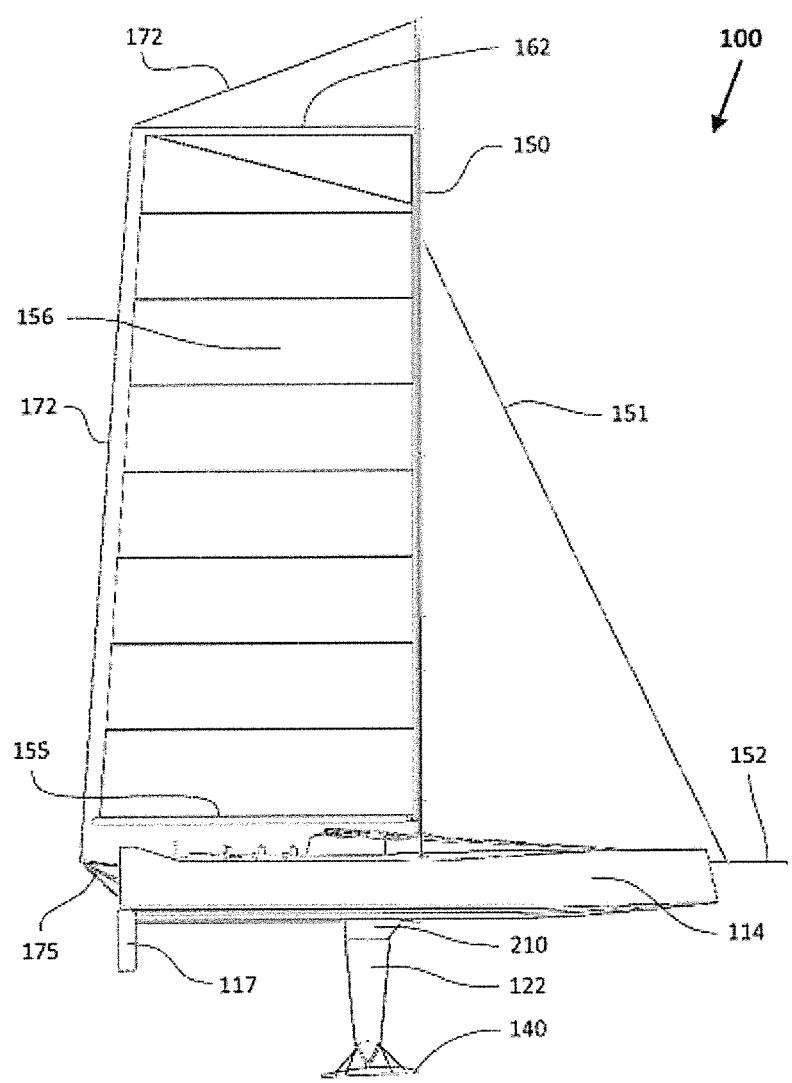

A second embodiment of an arrangement of the rigging of the sailing vessel (100) may be provided with an arrangement of two triangular structures and an additional backstay arrangement shown in FIG. 4F. A topmast rigid triangular structure is provided comprising port and starboard topmast sprits (161, 162) and a topmast spar (163). Port (171) and starboard (172) backstays constitute one contiguous cable connected by a backstay link (173) thereby accommodating the canting mast (150) varying the lengths and attitude. Backstays (171, 172) are coupled to port (174) and starboard (175) retractable stern-sprits mounted on the transom. With reference to FIG. 1H, port (176) and starboard (177) struts are demountable with locking pins to permit deployment or retraction of the stern sprits (174, 175).

The backstay arrangement shown in FIG. 4F has the purpose of avoiding a potential weakness in a mast where shrouds attach. Known designs may have no fixed rigging superior to attachment. Consequently the force directed forward on a mast superior to this point may be at risk of failure due to human error secondary to mal-adjustment of (non-fixed) 'running' backstays. FIG. 4F, includes a fixed aft stay arrangement eliminating risk of human error.

In the described embodiment, the boom (155) extends beyond the transom thereby accommodating a larger mainsail. A fixed stay arrangement incorporating topmast (161, 162) and retractable stern sprits (174, 175) permit unimpeded rotation of boom (155). The varying length of the back stays secondary to canting the mast (150) is provided for by the port and starboard backstays (171, 172) forming a contiguous closed loop arrangement via backstay link (173).

The described sailing vessel has a fixed bowsprit (152). Stern sprits (174, 175) retract prior to the sailing vessel maneuvering astern into a mooring.

The keel arrangement (120) may be formed of a rotational housing and two keel fins (122, 123) which converge to an apex at which a ballast bulb (140) may be provided. The form of the rotational housing is described further below with reference to FIGS. 5A, 5B, 5C, 6A, 6B and 6C.

Referring to FIG. 2, an embodiment of the keel arrangement (120) is shown in isolated detail from the sailing vessel. The keel arrangement (120) may include a rotational housing (210) and two keel fins (122, 123) which converge to an apex at which a ballast bulb (140) may be provided.

The keel arrangement (120) cants around a shaft (202) with an axis of rotation (201) running longitudinally fore and aft of the sailing vessel. The keel arrangement (120) is canted by a keel mechanical canting mechanism (220) part of which is shown in FIG. 2 and which is described in more detail in relation to FIGS. 3A, 3B and 3C.

Figure 3A:
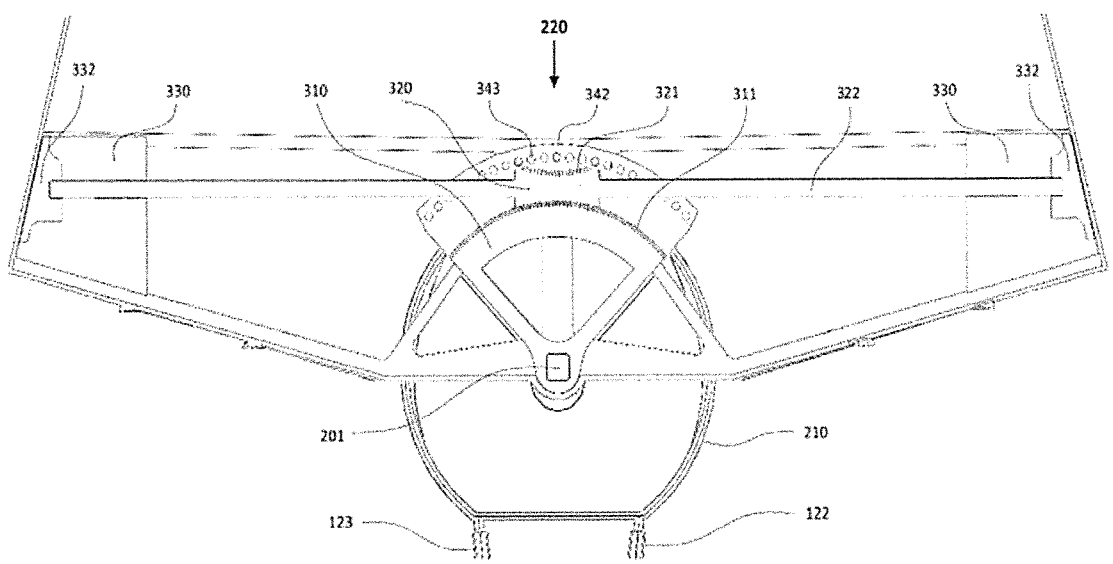
FIG. 3A is a cross-sectional view of a keel mechanical canting mechanism in accordance with an aspect of the present invention.
Figure 3B:
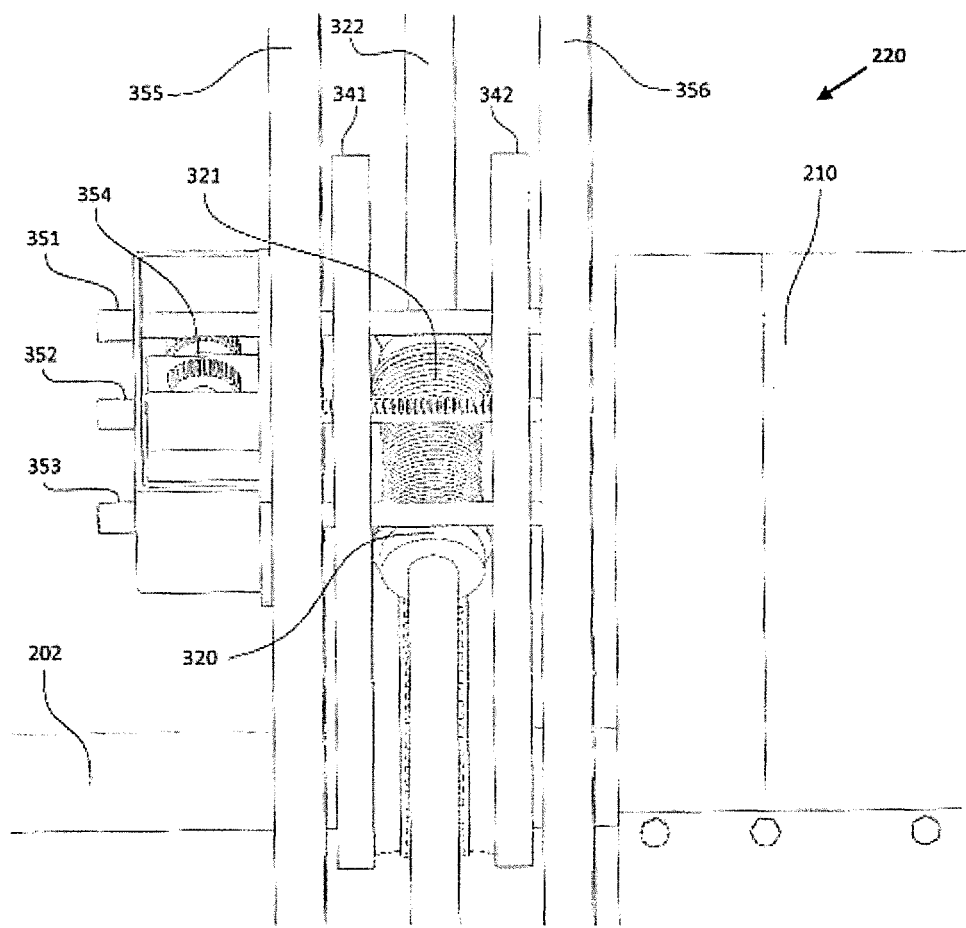
FIG. 3B is a perspective view of the keel mechanical canting mechanism of FIG. 3A.
Figure 3C:
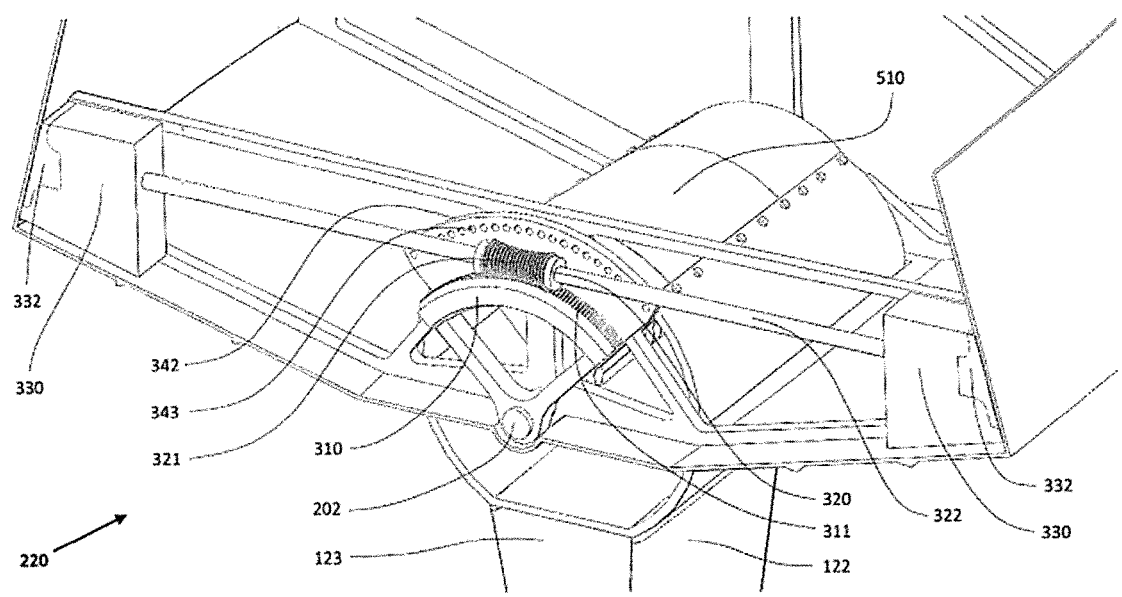
FIG. 3C is a further perspective view of the keel mechanical canting mechanism of FIG. 3A.

Referring to FIGS. 3A, 3B and 3C an embodiment of the keel mechanical canting mechanism (220) is shown. The keel mechanical canting mechanism (220) may include a first worm gear (310) and a first worm (320). The first worm gear (310) may rotate in a fixed relationship with the keel arrangement (120) around the axis (201) of rotation. The first worm (320) may have a helical thread (321) which engages with the teeth (311) of the first worm gear (310).

In one embodiment, the first worm (320) may be a double-enveloping worm for high power transmission which has a waisted-shape which conforms to the arc of the first worm gear (310). A double-enveloping worm provides improved locking as all of the teeth (311) of the first worm gear (310) are in contact with the helical thread (321) of the first worm (320). It should be understood that the first worm and first worm gear may optionally be recirculating ball worm and worm gear in which the threads are filled with bearing balls that recirculate through the gear and worm as it turns, reducing friction and wear in the gear.

The first worm (320) may be driven by a first driving means (330) which may take the form of two motors or other drive means at either end of a rotational drive shaft (322) of the first worm (320). The drive means may include a manual override in case of emergency. Locating bearings (332) or thrust plates position and provide lateral stability for the rotational drive shaft (322) of the first worm (320).

The keel mechanical canting mechanism (220) may include locking mechanisms, the primary arrangement being the self-locking action inherent in a double-enveloping worm gear system. The secondary keel locking arrangement may be formed of an extension to the first worm gear (310) in the form of arc shaped parallel extensions (341, 342) either side of the teeth (311) of the first worm gear (310). The parallel extensions (341, 342) may include multiple apertures (343) spaced radially around the arc of the parallel extensions (341, 342). The secondary keel locking arrangement may include three pins (351, 352, 353) which are in fixed lateral relationship to the sailing vessel's hull, for example by being mounted through two lateral supports (355, 356) of the sailing vessel. The pins (351, 352, 353) may be driven by a driving component (354) to slide in a longitudinal direction of the pins (351, 352, 353) to be insertable through selected apertures (343) in the parallel extensions (341, 342) to lock the first worm gear (310) at a selected position relative to the sailing vessel's hull.

Referring to FIGS. 4A to 4E, an embodiment of the mast mechanical canting mechanism (400) is shown. The mast mechanical canting mechanism (400) may correspond to the keel mechanical canting mechanism in an inverted form in the sailing vessel. The mast (150) may be pivoted around an axis of rotation (401) which runs longitudinally fore and aft though the sailing vessel parallel to the axis of rotation (201) of the keel arrangement (120) and vertically above the axis of rotation (201) of the keel arrangement (120).

The mast mechanical canting mechanism (400) may, in a similar arrangement to the keel mechanical canting mechanism (220) include a worm gear (410) and a worm (420), these are referred to as the second worm gear (410) and second worm (420). The second worm gear (410) may rotate in a fixed relationship with the mast (150) around the axis (401) of rotation. The second worm (420) may have a helical thread (421) which engages with the teeth (411) of the second worm gear (410).

In one embodiment, the second worm (420) may be a double-enveloping worm for high power transmission which has a waisted-shape which conforms to the arc of the second worm gear (410). It should be understood that the second worm and second worm gear may be recirculating ball worm and worm gear in which the threads are filled with bearing balls that recirculate through the gear and worm as it turns reducing friction and wear in the gear.

The second worm (420) may be driven by a second driving means (430) which may take the form of two motors at either end of a rotational drive shaft (422) of the second worm (420). Locating bearings (432) or thrust plates position and provide lateral stability for the rotational drive shaft (422) of the second worm (420).

The mast mechanical canting mechanism (400) may include locking mechanisms, the primary mast locking arrangement being similar to the primary locking arrangement for the keel canting. The secondary mast locking arrangement may be formed of an extension to the second worm gear (410) in the form of arc shaped parallel extensions (441, 442) either side of the teeth (411) of the second worm gear (410). The parallel extensions (441, 442) may include multiple apertures (443) spaced radially around the arc of the parallel extensions (441, 442). The secondary mast locking arrangement may include two pins (451, 452) which are in fixed lateral relationship to the sailing vessel's hull. The fixed lateral relationship to the sailing vessel's hull may be provided by mounted holes (457, 458) through two lateral supports (455, 456) of the sailing vessel though which the pins (451, 452) are arranged. The pins (451, 452) may be driven by a driving component (454) to slide in a longitudinal direction of the pins (451, 452) to be insertable through selected apertures (443) in the parallel extensions (441, 442) to lock the second worm gear (410) at a selected position relative to the sailing vessel's hull.

Referring to FIG. 4E, the mast (150) may include further support in the form of a rigid triangular rigging arrangement formed of two triangular stays (153, 154) and a cross member (463) which support the second worm gear (410). An extended bow sprit (152) may extend along the axis of rotation (401) of the mast (150) and form a second triangle with the forestay (151) and the mast (150). A boom (155) is also shown.

Figure 5C:
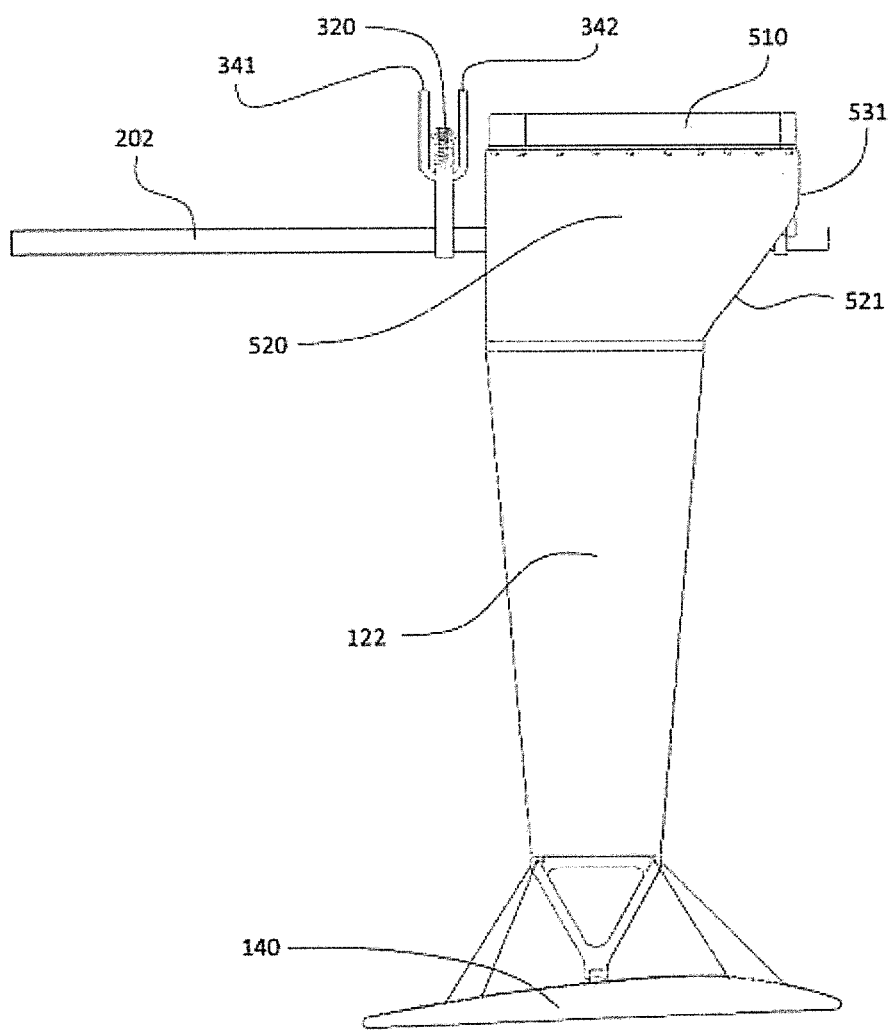
FIG. 5C is a side view of an alternative embodiment of the keel arrangement.

Referring to FIGS. 5A, 5B and 5C which are further views of the keel arrangement (120) shown in FIG. 2, further detail of the rotational housing (210) is provided.

The rotational housing (210) may be formed in a generally hollow truncated conical or generally cylindrical form around the shaft (202) of the canting keel arrangement. The keel mechanical canting mechanism (220) of the first worm gear (320) is shown.

The rotational housing (210), rotatable about an axis (201), may have a superior portion (510) of approximately a quadrant of the housing which is located in use within the hull of the sailing vessel. Two opposing lateral sides (520, 530) form two more approximate quadrants. The opposing lateral sides (520, 530) are of uniform cross-section profile from fore to aft and one of the lateral sides (520, 530) acts as foil promoting lateral resistance in the water when the keel arrangement is canted and that lateral side (520, 530) rotates below the hull of the sailing vessel. The remaining lower approximate quadrant may be a flat or curved section (540) joining the two keel fins (122, 123) of the keel arrangement (120).

When the keel is in a neutral position (perpendicular to the bottom of the hull) the portion of the rotational housing (210) that extends below the bottom of the hull is generally cylindrical. The inside and outside surfaces are smooth and the thickness fore to aft is uniform, and the walls of the cylinder are parallel to the longitudinal axis of the hull. As the keel cants to windward, the windward side of the cylinder retracts into the hull and the leeward side extends into the water. As the keel continues to cant, the leading edge of the cylinder on the leeward side moves inward toward the longitudinal axis.

FIG. 5A shows an embodiment in which the upper portion of the rotational housing (210) is of a generally truncated conical shape.

In the embodiment of FIG. 5A, the inside and outside surfaces are still smooth and the thickness for to aft is still uniform but the walls of the cylinder are no longer parallel to the longitudinal axis. The radius of the aperture at the leading edge is noticeably smaller than the radius of the aperture at the trailing edge giving an overall conical shape, but only in the upper portion of the cylinder i.e. that portion of the cylinder that is in the water when the keel is canted over. When the keel is canted over at 45 degrees, the leading edge on the leeward side may be offset inwards by 5 degrees to the longitudinal axis. The net effect is that when the keel is canted over the leeward side of the housing becomes a semi-circular or semi-conical daggerboard with the leading edge offset inwards by 5 degrees. This will have the effect of countering leeward drift.

FIG. 5B shows that the leading edges (521, 531) of the opposing lateral sides (520, 530) are curved from the superior portion (510) towards the aft of the sailing vessel.

FIG. 5C shows an alternative embodiment in which the rotational housing (210) is generally cylindrical in shape including the upper portion.

Figure 6B:
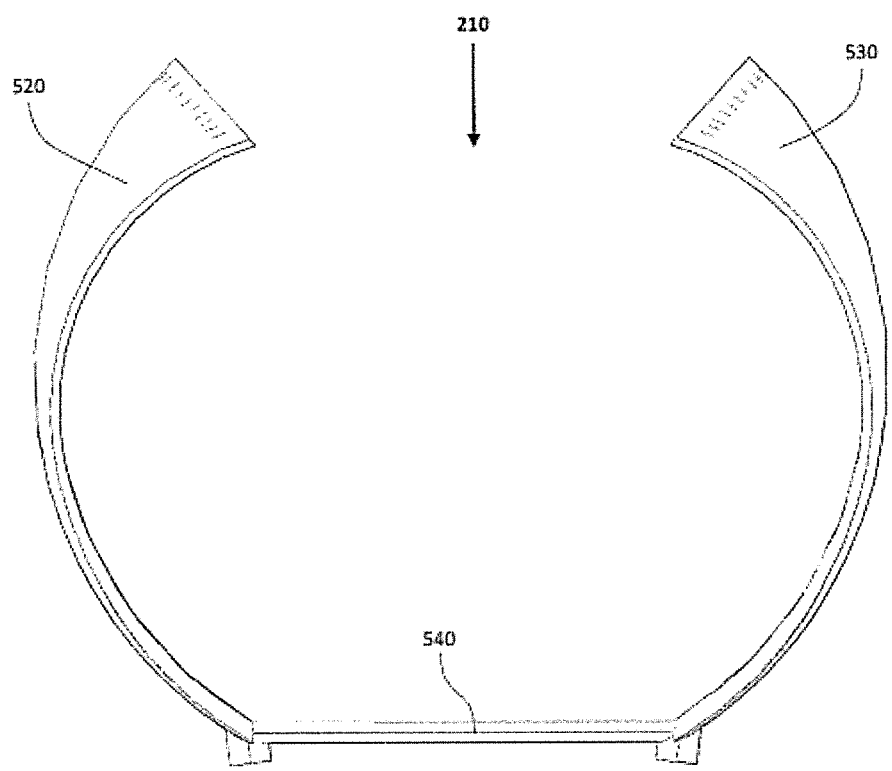
FIG. 6B is a perspective view from the front of the generally cylindrical or truncated conical housing of FIG. 6A.

Referring to FIGS. 6A to 6C, the form of the opposing lateral sides (520, 530) is shown. FIG. 6A shows the leading edges (521, 531) of the opposing lateral sides (520, 530) which may have a curved taper.

FIG. 6C shows the starboard lateral side (520) rotated externally. The keel arrangement is canted to port by approximately 45 degrees.

The opposing lateral sides (520, 530) may in an alternative embodiment 'foil' towards the inside of the cylinder near to the leading edges (521, 531) with the trailing edges having virtually no foiling of the profile. The flat section (540) may have a constant profile.

Port (or starboard) lateral sides (520, 530) provide a form of quarter-circle foiled daggerboard(s), one retracted the other deployed. Forward motion of the sailing vessel and therefore the lateral side (520, 530) through the water generates "lift" (or force) to counter leeward drift of the hull.

Leeward drift of the sailing vessel is countered by deployment of the lateral sides (520, 530). When the keel arrangement is canted to windward, the leeward lateral side is deployed whilst the windward lateral side retracts. The forward passage of the lateral side (520, 530) through water generates 'lift', the vector of which opposes the leeward drift of the hull.

It is envisaged that the rotational housing (210) and lateral sides (520, 530) may be used with (or without) other forms of canting keel including hydraulic canting keels.

Referring to FIGS. 7A to 7F, an embodiment of a ballast bulb (140) is shown. The ballast bulb (140) is provided at the base of the keel arrangement (120) and is of foiled profile in both a longitudinal and lateral cross-section of the ballast bulb (140).

Figure 7D:
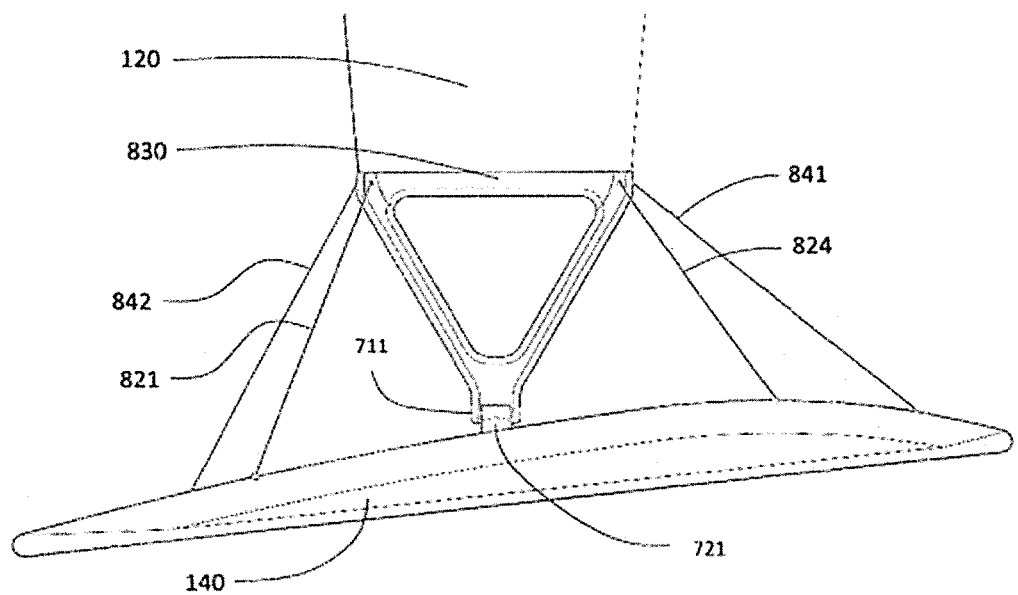
FIG. 7D is a side view of the ballast bulb of FIG. 7A in a second rotated position of a pitch rotation.

In the described embodiment, the ballast bulb (140) has two axes of rotation (710, 720) about which the ballast bulb (140) may rotate. Rotation around the first axis of rotation (710) will adjust the roll of the ballast bulb (140) around a hinged support (711) as shown in FIGS. 7A and 7B. Rotation around the second axis of rotation (720) will adjust the pitch of the ballast bulb (140) around a hinged support (721) as shown in FIGS. 7C and 7D.

FIGS. 7E and 7F show the hinged supports (711, 721) and the first and second axes of rotation (710, 720). The hinged support (721) of the second axis of rotation (720) may be within the ballast bulb (140). The hinged supports (711, 721) may be cylindrical rotational supports.

Figure 8A:
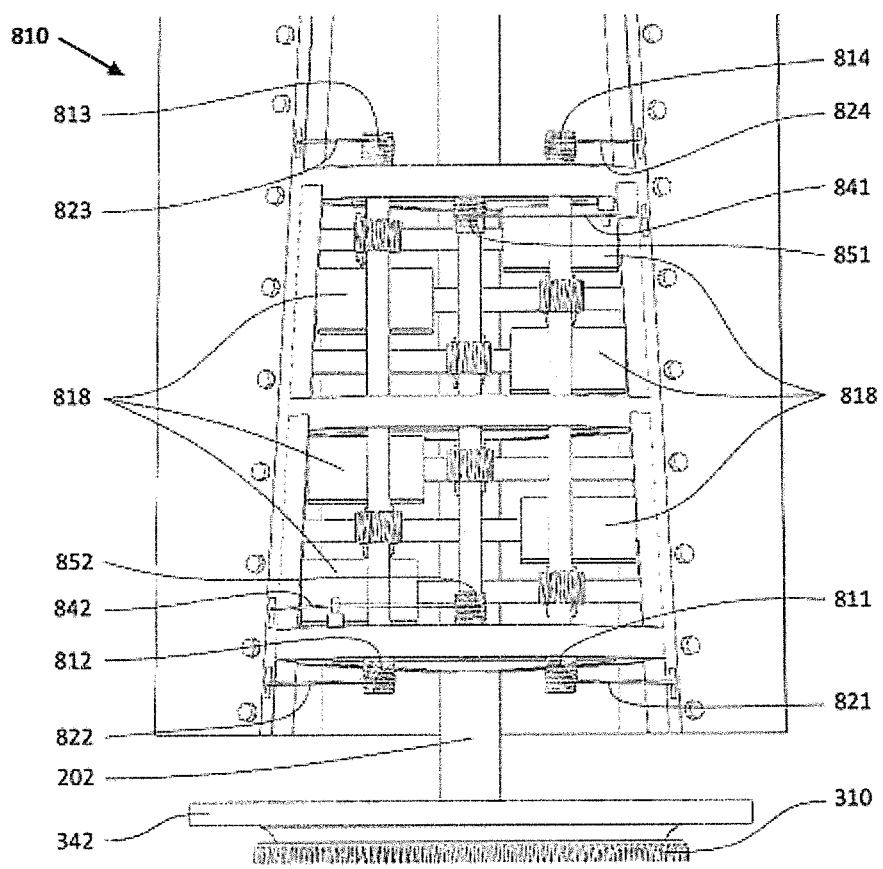
FIG. 8A is a plan view of a control mechanism of the ballast bulb of FIG. 7A.

Control of the rotation may be provided by control actuators (818) shown in FIGS. 8A and 8B provided in the sailing vessel which control four wires (821, 822, 823, 824) extending through the keel arrangement (120) and emerging at the apex (830) of the keel arrangement (120) and then extending externally to the four quadrants of the superior surface (820) of the ballast bulb (140). Tensioning or releasing the four wires (821, 822, 823, 824) by coil winches (811, 812, 813, 814) driven by control actuators (818) may adjust the pitch and roll of the ballast bulb (140).

The sailing vessel's ballast bulb (140) is configured as a hydrofoil. The hydrofoil may articulate with respect to the keel arrangement via two hinged supports external and internal of hydrofoil casing. External hinged support rotates the hydrofoil around its long axis (in a range of approximately 140°) and the internal hinged support permits varying foil's angle-of-attack (in a range of approximately 20°). Rotation around the long axis permits direction of 'lift' generated by foil to be directed between either raising hull relative to water or into a 'righting moment'. Adjustment to the 'angle-of-attack' controls the quantum of 'lift' generated.

Figure 9A:
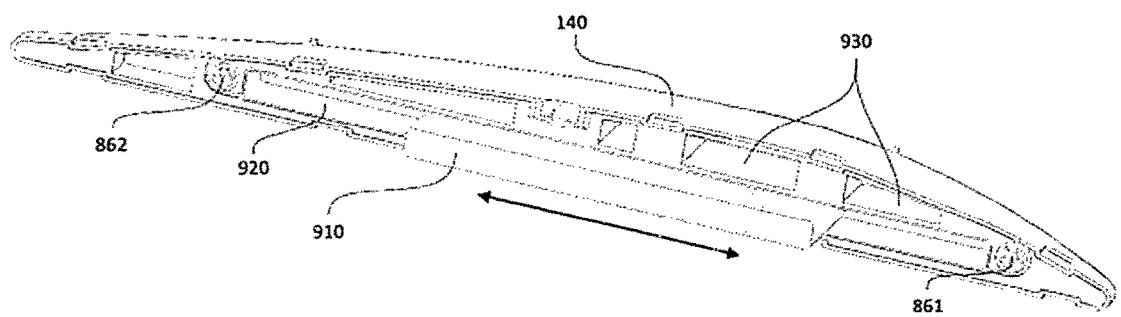
FIG. 9A is a perspective view of an open ballast bulb in accordance with an aspect of the present invention.
Figure 9B:
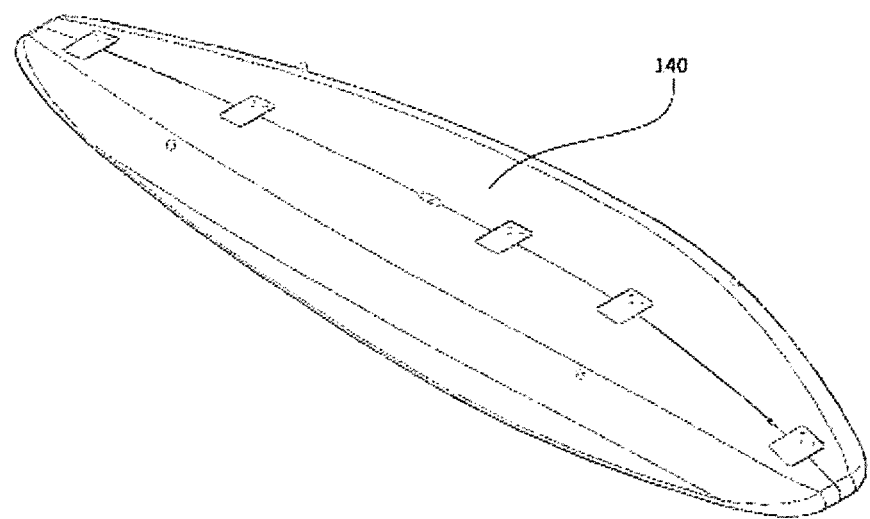
FIG. 9B is a perspective view of a closed ballast bulb in accordance with an aspect of the present invention.

Referring to FIGS. 9A and 9B, an embodiment of a ballast bulb (140) is shown. In this embodiment, the ballast bulb (140) may include a moveable heavy mass (910) within a longitudinal compartment (920) of the ballast bulb (140). Forward or aft adjustment of ballast permits 'trimming' of the vessel's hull.

The moveable heavy mass (910) may be controlled via the actuators (818) shown in FIG. 8 with wires (841, 842) extending from coil winches (851, 852) in the sailing vessel. The wires (841, 842) may pass around wheels (861, 862) to slide the moveable heavy mass (910) within the longitudinal compartment (920).

FIG. 9A also shows additional compartments (930) which may be provided in the ballast bulb (140) which may house electric batteries for the sailing vessel. FIG. 9B shows the ballast bulb (140) in a closed form.

The ballast bulb (140) casing may be demountable into two halves. The ballast bulb (140) may thus be disassembled when the vessel is on 'the hard' thereby accessing internal compartments wherein a heavy metal mass is located. The internal design of housing may be configured into compartments that permit reduction or increase of mass of heavy metal ballast and/or ballast's location. The compartments may additionally permit utilising Valve-Regulated Lead Acid batteries as ballast within the ballast bulb compartments.

Figure 10B:
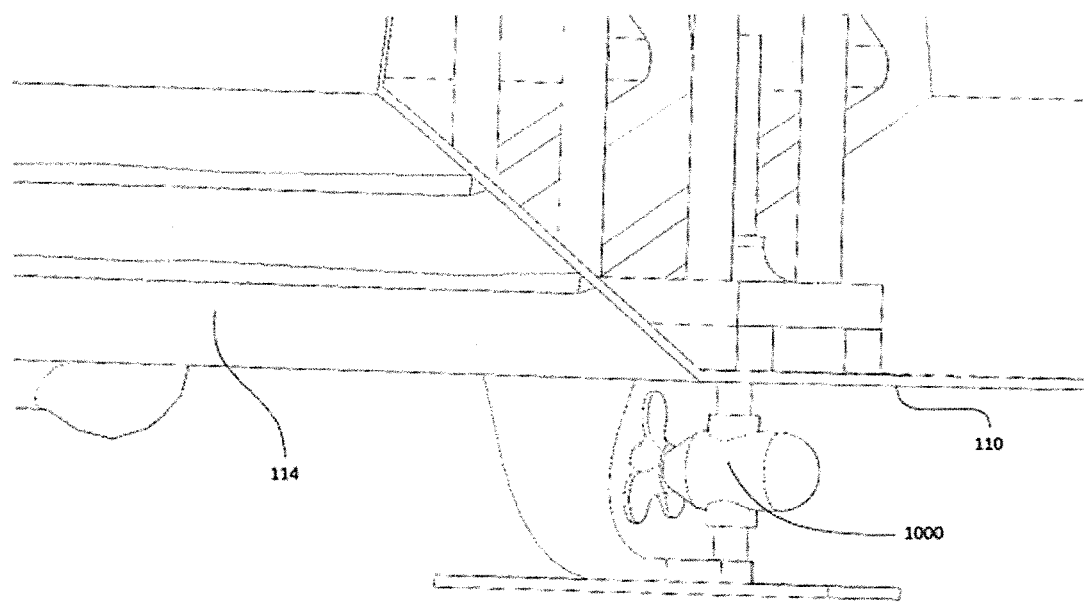
FIG. 10B is a perspective view of the propulsion system of FIG. 10A.

Referring to FIGS. 10A and 10B, a retractable propulsion system (1000) may be provided positioned forward of the mast mechanical canting mechanism (400). The propulsion system (1000) may comprise a retractable azimuth electric motor powered thruster located amidships forward of amidships of vessel's hull. The propulsion system (1000) may also function as a turbine electric generator.

Figure 11B:
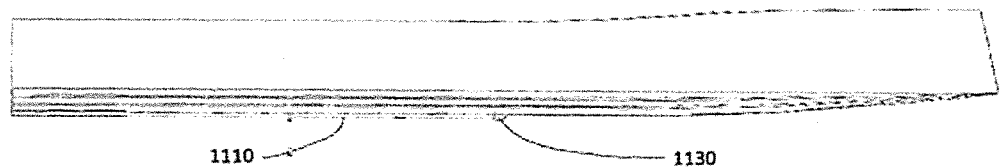
FIG. 11B is a side view of the hull of FIG. 11A.

Referring to FIGS. 11A and 11B, an embodiment of the underside (1100) of the hull (110) is shown including a housing (1110) for the shaft (202) of the keel mechanical canting mechanism (220). The hull may be configured to incorporate a semi-circular recess located in the aft two-thirds of the midline of the hull between port and starboard chines. At least some of the recess houses and permits access to the shaft (202) around which the keel's canting mechanism rotates.

The figures show the hard chines of the hull (110) with a port semi-hull chine (111) and a starboard semi-hull chine (112). A third chine (1120) is shown from the bow of the sailing vessel to the mid-section of the sailing vessel.

Hull construction of a sailing vessel may utilise a hard chine technique. Hard chine reduces cost by simplifying construction whether in metal, plywood, composites, or other materials. Fabrication of a mould for the hull may be avoided. The proposed arrangement may have three or more bow chines converging aft into two chines in the aft third of the hull configured as port and starboard semi-hulls. The deadrise or 'angle of offset' between port and starboard aft chines is configured such that when leeward semi-hull's attitude is 'on an even-keel', the windward semi-hull is substantially clear of water.

The described design of the hull additionally incorporates features which counter the leeward drift that occurs secondary to the force generated by the wind on the sails. Conventional keeled sailing boats utilise the fin of the keel to counter leeward drift; however, canting the keel increasingly diminishes this counter-force. The hull's sheer strake (leeside of hull) is configured such that when lee-hull is sailed on an even-keel, the sheer strake is orientated perpendicular to the water surface, thereby imparting a resistance to leeward movement. Additional counter-force to leeward drift is generated by the asymmetry that occurs (port sheer strake relative to starboard sheer strake) as hull heels to leeward, so windward sheer strake rises clear of the water.

Vessel's deck and cockpit are configured wherein port and starboard components thereof (offset one to the other) such that when leeward semi-hull is sailing on an even-keel, windward hemi-deck and hemi-cockpit are orientated parallel to water.

The forward termination of the shaft housing (1110) may provide a location for a 3D forward-scanning sonar transducer housing (1130). The housing (1130) may be a bulb located amidships forward of the termination of the shaft housing (1110).

A hatch (1140) for a retractable propulsion system (1000) is shown in the underside (1100) of the hull (110). Slots (1150) are also shown for the location of the lateral sides (520, 530) of the rotational housing (210) of the keel arrangement (120).

Figure 12A:
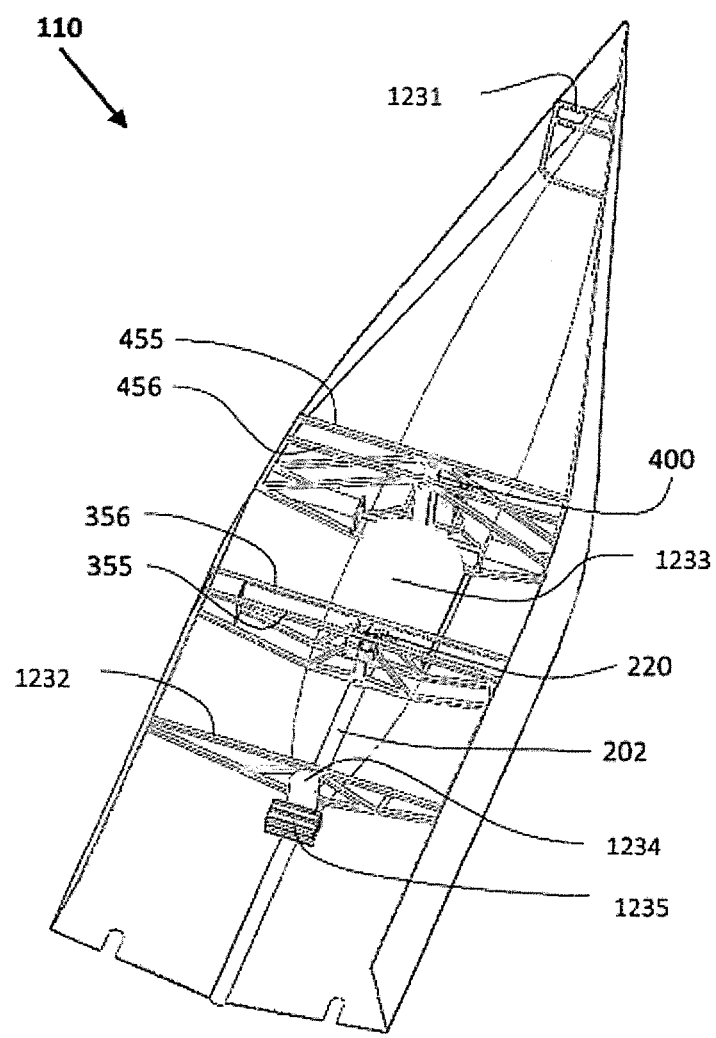
FIG. 12A is a perspective cut-away view of a hull of a sailing vessel showing additional aspects of the present invention.
Figure 12B:
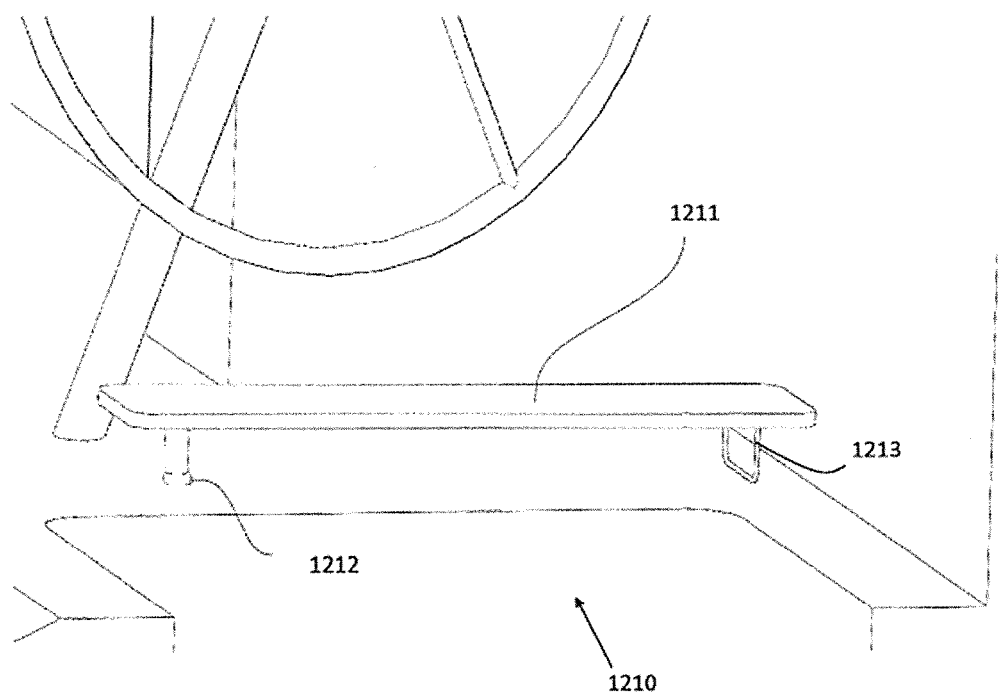
FIG. 12B is a perspective view of a helmsman's pedestal in accordance with an aspect of the present invention.
Figure 12C:
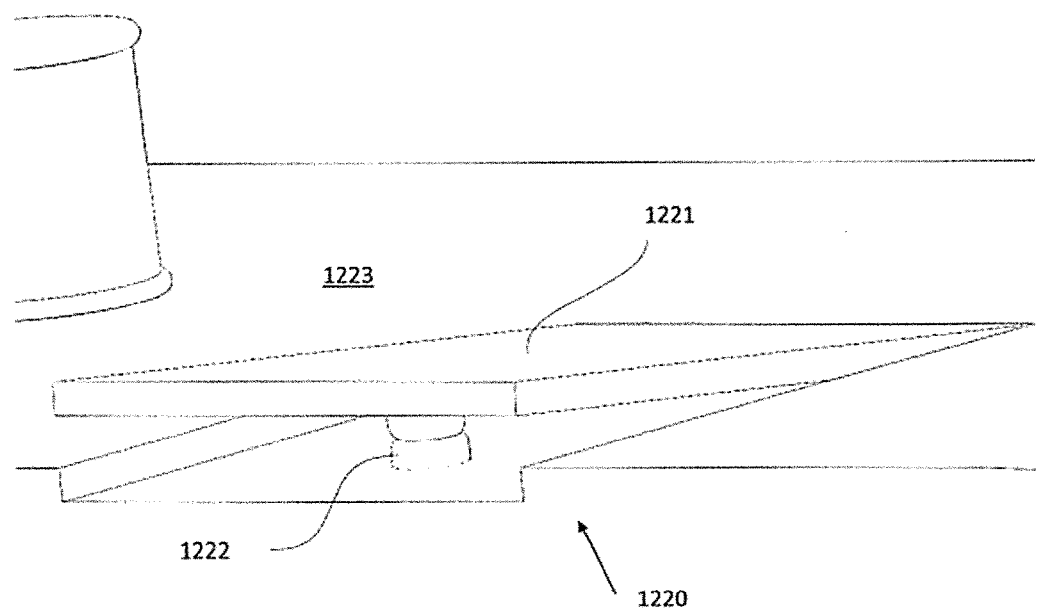
FIG. 12C is a perspective view of a deck seat in accordance with an aspect of the present invention.

Referring to FIGS. 12A to 12C, an embodiment of the sailing vessel is shown having an integrated water-making apparatus.

Many sailing vessels have water-making apparatus coupled to a diesel engine. The engine is often run for a few hours a day to charge batteries, the water-maker concomitantly generating fresh water. The described water-making apparatus utilises either the helmsman's (standing position) weight or a crew member's (sitting position) weight to provide the power/energy (gravity) required for the reverse osmosis process by which the water-making apparatus functions.

FIG. 12A shows a cut away view (1230) of the hull (110) including the lateral supports (455, 456) either side of the mast canting mechanism (400) and the lateral supports (355, 356) on either side of the keel canting mechanism (220). Additional lateral supports or bulkheads are provided at the bow (1231) and at the stern (1232). This figure shows a fresh water storage tank (1234) and a reverse osmosis membrane unit (1235). This figure also shows the watertight enclosure (1233) affixed and sealed to the interior surface of the hull and which surrounds the generally cylindrical or truncated conical housing of the keel arrangement.

FIG. 12B shows an embodiment of a helmsman's weight transmission apparatus (1210) in the form of a hinged (1213) pedestal (1211) which articulates with a reverse-osmosis water generator (1212).

FIG. 12C shows an embodiment of a crew member's weight transmission apparatus (1220) in the form of a hinged seat (1221) provided on a portion of the deck (1223) which articulates with a reverse-osmosis water generator (1222).

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A sailing vessel having a hull, a keel, a mast, a ballast bulb in the form of a hydrofoil providing lift and ballast at the base of the keel and a control apparatus for controlling adjustment of the ballast bulb in relation to the keel, wherein the control apparatus includes: a first rotating mechanism for rotating the ballast bulb around a lateral axis of the ballast bulb to change the pitch of the ballast bulb in relation to the keel; and a second rotating mechanism for rotating the ballast bulb around a longitudinal axis of the ballast bulb to change the roll of the ballast bulb in relation to the keel, and change the direction of lift generated by the hydrofoil.

2. The sailing vessel as claimed in claim 1, wherein said control apparatus includes a pitch actuator and a roll actuator connected to the ballast bulb by means of wires between each quadrant of an upper surface of the ballast bulb and the keel.

3. The sailing vessel as claimed in claim 1, wherein the ballast bulb includes a compartment extending longitudinally within the ballast bulb and a movable mass housed within the compartment and movable longitudinally in the compartment to alter the ballast distribution in the ballast bulb.

4. The sailing vessel as claimed in claim 3, wherein the ballast bulb includes at least one further compartment which is accessible when the sailing vessel is out of the water.

5. The sailing vessel as claimed in claim 2, wherein the ballast bulb includes a compartment extending longitudinally within the ballast bulb and a movable mass housed within the compartment and movable longitudinally in the compartment to alter the ballast distribution in the ballast bulb.

6. The sailing vessel as claimed in claim 5, wherein the ballast bulb includes at least one further compartment which is accessible when the sailing vessel is out of the water.

7. A sailing vessel having a hull, a keel, a mast, a ballast bulb providing ballast at the base of the keel and a control apparatus for controlling adjustment of the ballast bulb in relation to the keel, wherein the control apparatus includes: a first rotating mechanism for rotating the ballast bulb around a lateral axis of the ballast bulb to change the pitch of the ballast bulb in relation to the keel; and a second rotating mechanism for rotating the ballast bulb around a longitudinal axis of the ballast bulb to change the roll of the ballast bulb in relation to the keel, wherein said control apparatus includes a pitch actuator and a roll actuator connected to the ballast bulb by means of wires between each quadrant of an upper surface of the ballast bulb and the keel.

8. The sailing vessel as claimed in claim 7, wherein the ballast bulb includes a compartment extending longitudinally within the ballast bulb and a movable mass housed within the compartment and movable longitudinally in the compartment to alter the ballast distribution in the ballast bulb.

9. The sailing vessel as claimed in claim 8, wherein the ballast bulb includes at least one further compartment which is accessible when the sailing vessel is out of the water.

\* \* \* \* \*